United States Patent [19]
Saito

[11] Patent Number: 5,821,938
[45] Date of Patent: Oct. 13, 1998

[54] APPARATUS FOR SHAPING FIGURES TO BE POINT SYMMETRICAL

[75] Inventor: Shigeru Saito, Tokyo, Japan

[73] Assignee: NEC Corporation, Tokyo, Japan

[21] Appl. No.: 656,469

[22] Filed: May 31, 1996

[30] Foreign Application Priority Data

May 31, 1995 [JP] Japan ................................. 7-133791

[51] Int. Cl.$^6$ .................................................. G06T 3/00
[52] U.S. Cl. ............................................................ 345/418
[58] Field of Search .................................. 345/418, 433, 345/437, 435, 121, 126; 382/288, 289

[56] References Cited

U.S. PATENT DOCUMENTS 4,989,257  1/1991  Horowitz ................................... 382/18

FOREIGN PATENT DOCUMENTS 62-111369  5/1987  Japan .

*Primary Examiner*—Almis R. Jankus
*Attorney, Agent, or Firm*—Foley & Lardner

[57] ABSTRACT

If a polygon having an even number of vertexes, which are $2n$ in number, is input, a middle point calculation unit 24 pairs the m-th and (m+n)-th vertexes together, and calculates the coordinates of the middle points on the line segments between the vertexes of the respective pairs, which are n in number. A centroid calculation unit 25 calculates the coordinates of the centroid of the middle points. A distance calculation unit 26 calculates the distances between the centroid and the middle points. If all the distances between the centroid and the middle points are within a specified allowable range, a symmetry decision unit 27 sets the centroid as the center of point symmetry. If the centroid is selected as the center of point symmetry, a symmetrizing unit 28 corrects part or all of the vertexes to symmetrize the polygon with respect to the centroid.

16 Claims, 17 Drawing Sheets

APPARATUS FOR SHAPING FIGURES TO BE POINT SYMMETRICAL

BACKGROUND OF THE INVENTION

The present invention relates to an apparatus for shaping an input polygon having an even number of vertexes by symmetrizing with respect to a point, and outputting the symmetrized polygon.

A conventional apparatus of this type for detecting symmetric figures is disclosed in a Japanese patent application laid open as a Provisional Publication No. 111369/'87 for example. The conventional apparatus reads a design drawing or the like as binary image data, extracts line segment elements, symbol elements, etc., and files them in a database to facilitate design automation, for example.

As shown in FIG. 21, the conventional apparatus includes:

a preprocessing unit 101 for extracting symbol elements from an input figure before an recognition process;

a symbol table 102 beforehand prepared for defining each of various symbol elements as either symmetric or not;

a recognition unit 103 for judging if a symbol element extracted by the preprocessing unit 101 is quasi symmetric or not, and outputting the result of judgment; and a conversion unit 104 for converting extracted symbol elements to make a figure symmetric to the input figure for confirming the symmetry of the input figure if the unit 103 judges the elements to be nearly symmetric.

By referring to the symbol table 102, it is possible, without complex operation, to judge quickly if the input symbol element is quasi symmetric or not.

It is impossible, however, to define all symbol elements in the symbol table 102 as either symmetric or not. Therefore, there is rest a problem in the conventional apparatus that if a symmetric figure not defined in the symbol table 102 is input in the apparatus, its symmetry cannot be recognized.

SUMMARY OF THE INVENTION

Therefore, a primary object of the invention is to provide an apparatus for shaping a polygon which can shape a quasi point symmetric polygon of any type into an intended point symmetric polygon as far as it is a polygon having an even number of vertexes input with a certain accuracy or precision.

In order to achieve the object;

an apparatus in a first aspect of the invention for shaping a polygon of the present invention comprises:

an input means for inputting a figure;

a feature extraction means for extracting values of graphic features including coordinates of vertexes from said figure when said figure is detected as a polygon;

a vertex number judgment means for judging whether said figure is a polygon with an even number of vertexes or not from said values of graphic features extracted;

a middle point calculation means for calculating, when a number of vertexes of said figure is detected to be 2n (n being an integer larger than one), coordinates of each of middle points of n line segments, each of said n line segments linking m-th vertex and (n+m)-th vertex from a vertex of said figure (m being an integer from one to n);

a centroid calculation means for calculating coordinates of a centroid of said middle points from said coordinates of each of said middle points;

a distance calculation means for calculating each distance between said centroid and each of said middle points;

a symmetry discrimination means for judging whether all of said each distance between said centroid and each of said middle points are within a specified allowable range and, if so, setting said centroid as a center of point symmetry of said figure;

a symmetrizing means for modifying at least one of said values of graphic features for shaping said figure into a point symmetric polygon having a center thereof at said center of point symmetry; and an output means for outputting said point symmetric polygon after shaped.

Therefore, when a polygon having 2n of vertexes is input, the middle point calculation means calculate coordinates of each of middle points of n line segments linking a first vertex to a (n+1)-th vertex, a second vertex to a (n+2) vertex, . . . , and a n-th vertex to a 2n-th vertex. From the results of the calculation, the centroid calculation means calculate the coordinates of a centroid of the n middle points. The distance calculation means calculate the distances between the centroid and the n middle points. The symmetry discrimination means judge if the distances are all within a specified allowable range and, if so, the symmetry discrimination means discriminate the input figure as a quasi point symmetric polygon, regarding the centroid as the center of point symmetry. Then, the symmetrizing means make corrections to the coordinates of part or all of the vertexes necessary to symmetrize the input figure into an ideal point symmetric polygon with respect to the centroid.

Thus, the apparatus for shaping a polygon of the invention can shape quasi point symmetric polygons of any type into ideal point symmetric polygons.

As for the specified allowable range referred to by the symmetry discrimination means, it may be set optionally according to user's convenience. It may be either variable according to sizes of input figures or fixed independent of the sizes. In an example, the allowable range is specified as 0.05 to 0.1 of total of side lengths of the input figure.

An apparatus in a second aspect of the invention for shaping a polygon comprises:

an input means for inputting a figure;

a feature extraction means for extracting values of graphic features including coordinates of vertexes from said figure when said figure is detected as a polygon;

a vertex number judgment means for judging whether said figure is a polygon with an even number of vertexes or not from said values of graphic features extracted;

a middle point calculation means for calculating, when a number of vertexes of said figure is detected to be 2n (n being an integer larger than one), coordinates of each of middle points of n line segments, each of said n line segments linking m-th vertex and (n+m)-th vertex from a vertex of said figure (m being an integer from one to n) and calculating coordinates of an average middle point from average values of coordinates of each of said middle points;

a centroid calculation means for calculating coordinates of a centroid of said middle points from said coordinates of each of said middle points;

a distance calculation means for calculating a distance between said centroid and said average middle point;

a symmetry discrimination means for judging whether said distance between said centroid and said average middle point is within a specified allowable range and, if so, setting said centroid as a center of point symmetry of said figure;

a symmetrizing means for modifying at least one of said values of graphic features for shaping said figure into a point symmetric polygon having a center thereof at said center of point symmetry; and an output means for outputting said point symmetric polygon after shaped.

In the second aspect, when a polygon having an even number of vertexes is input, the middle point calculation means calculate the coordinates of the middle points of each line segments linking the vertexes, and the centroid calculation means calculate the coordinates of the centroid of the middle points from the results of the calculation, as beforehand described. In addition, also average values of coordinates of the middle points are calculated here, and the distance calculation means calculate the distance between the centroid and the average middle point. The symmetry discrimination means judge if the distance between the centroid and the average middle point is within a specified allowable range or not and, if so, the symmetry discrimination means discriminate the input figure as a quasi point symmetric polygon, regarding the centroid as the center of point symmetry. Then, the symmetrizing means make corrections to the coordinates of part or all of the vertexes necessary to symmetrize the input figure into an ideal point symmetric polygon with respect to the centroid.

Therefore, the apparatus for shaping a polygon of the second aspect of the invention can shape quasi point symmetric polygons of any type into ideal point symmetric polygons in the same way as in the first aspect.

An apparatus in a third aspect of the invention for shaping a polygon comprises:

an input means for inputting a figure;

a feature extraction means for extracting values of graphic features including coordinates of vertexes from said figure when said figure is detected as a polygon;

a vertex number judgment means for judging whether said figure is a polygon with an even number of vertexes or not from said values of graphic features extracted;

a middle point calculation means for calculating, when a number of vertexes of said figure is detected to be 2n (n being an integer larger than one), coordinates of each of middle points of n line segments, each of said n line segments linking m-th vertex and (n+m)-th vertex from a vertex of said figure (m being an integer from one to n);

a candidate center calculation means for calculating coordinates of a candidate of a center of point symmetry of said figure on condition that said figure is a quasi point symmetric figure;

a distance calculation means for calculating each distance between said candidate and each of said middle points;

a symmetry discrimination means for judging whether all of said each distance between said candidate and each of said middle points are within a specified allowable range and, if so, setting said candidate as said center of point symmetry;

a symmetrizing means for modifying at least one of said values of graphic features for shaping said figure into a point symmetric polygon having a center thereof at said center of point symmetry; and an output means for outputting said point symmetric polygon after shaped.

In the third aspect, when a polygon having an even number of vertexes is input, the middle point calculation means calculate the coordinates of the middle points of each line segment linking the vertexes, as beforehand described. Then, the candidate center calculation means calculate coordinates of a candidate of a center of point symmetry of the input figure on condition that the figure is a quasi point symmetric figure. The distance calculation means calculate the distances between the candidate and the middle points of the line segments linking the vertexes.

The symmetry decision means judge if all the distances are within a specified allowable range and, if so, the symmetry discrimination means discriminate the input figure as a quasi point symmetric polygon, regarding the candidate as the center of point symmetry. Then, the symmetrizing means make corrections to the coordinates of part or all of the vertexes necessary to symmetrize the input figure into an ideal point symmetric polygon with respect to the candidate regarded as the center of point symmetry.

Here, as an example of the candidate center, there may be applied a center point of a minimum rectangle among rectangles which circumscribe at least two vertexes and surround the other vertexes of the figure. If the figure is a lozenge, for example, a minimum rectangle which circumscribes at least two vertexes of the lozenge and surrounds the other vertexes equals the rectangle which circumscribes the four vertexes of the lozenge, center of which coincides with that (center of point symmetry) of the lozenge.

An apparatus in a fourth aspect of the invention for shaping a polygon comprises:

an input means for inputting a figure;

a feature extraction means for extracting values of graphic features including coordinates of vertexes from said figure when said figure is detected as a polygon;

a vertex number judgment means for judging whether said figure is a polygon with an even number of vertexes or not from said values of graphic features extracted;

a middle point calculation means for calculating, when a number of vertexes of said figure is detected to be 2n (n being an integer larger than one), coordinates of each of middle points of n line segments, each of said n line segments linking m-th vertex and (n+m)-th vertex from a vertex of said figure (m being an integer from one to n) and calculating coordinates of an average middle point from average values of coordinates of each of said middle points;

a candidate center calculation means for calculating coordinates of a candidate of a center of point symmetry of said figure on condition that said figure is a quasi point symmetric figure;

a distance calculation means for calculating a distance between said candidate and said average middle point;

a symmetry discrimination means for judging whether said distance between said candidate and said average middle point is within a specified allowable range and, if so, setting said candidate as said center of point symmetry;

a symmetrizing means for modifying at least one of said values of graphic features for shaping said figure into a point symmetric polygon having a center thereof at said center of point symmetry; and an output means for outputting said point symmetric polygon after shaped.

In the fourth aspect, when a polygon having an even number of vertexes is input, the middle point calculation means calculate the coordinates of the middle points of each line segment linking the vertexes, and also calculate average values of coordinates of the middle points. Then, the candidate center calculation means calculate coordinates of a candidate of a center of point symmetry of the input figure on condition that the figure is a quasi point symmetric figure. The distance calculation means calculate the distance between the candidate and the average middle point. The symmetry discrimination means judge if the distance between the candidate and the average middle point is within a specified allowable range and, if so, the symmetry discrimination means discriminate the input figure as a quasi point symmetric polygon, regarding the candidate as the center of point symmetry. Then, the symmetrizing means make corrections to the coordinates of part or all of the vertexes necessary to symmetrize the input figure into an ideal point symmetric polygon with respect to the candidate regarded as the center of point symmetry.

An apparatus in a fifth aspect of the invention for shaping a polygon comprises:

an input means for inputting a figure;

a feature extraction means for extracting values of graphic features including coordinates of vertexes from said figure when said figure is detected as a polygon;

a vertex number judgment means for judging whether said figure is a polygon with an even number of vertexes or not from said values of graphic features extracted;

a candidate center calculation means for calculating, when a number of vertexes of said figure is detected to be 2n (n being an integer larger than one), coordinates of a candidate of a center of point symmetry of said figure on condition that said figure is a quasi point symmetric figure;

a symmetric point calculation means for calculating coordinates of n symmetric points of any n vertexes of said figure with respect to said candidate of a center of point symmetry;

a distance calculation means for calculating each length of n line segments, each of said n line segment linking said symmetric point and an associated vertex of each of said any n vertexes when a (m+n)-th vertex (in case m is not larger than n) or a (m−n)-th vertex (in case m is larger than n) is defined as said associate vertex of m-th vertex from a vertex of said figure (m being an integer from one to 2n);

a symmetry discrimination means for judging whether all of said each length of n line segments are within a specified allowable range and, if so, setting said candidate as said center of point symmetry;

a symmetrizing means for modifying at least one of said values of graphic features for shaping said figure into a point symmetric polygon having a center thereof at said center of point symmetry; and an output means for outputting said point symmetric polygon after shaped.

In the fifth aspect, when a polygon having an even number of vertexes is input, the candidate center calculation means calculate coordinates of a candidate of a center of point symmetry of the input figure on condition that the figure is a quasi point symmetric figure. Then, the symmetric point calculation means calculate coordinates of n symmetric points of any n vertexes of the figure with respect to the candidate of a center of point symmetry, and the distance calculation means calculate each length of n line segments linking the symmetric points of the n vertexes and their corresponding associated vertexes.

Here, the corresponding associated vertex of a m-th vertex means an opposite vertex of the m-th vertex, that is (m+n)-th vertex or (m−n)-th vertex.

Then, the symmetry discrimination means judge if lengths of all the n line segments are within a specified allowable range or not and, if so, the symmetry discrimination means discriminate the input figure as a quasi point symmetric polygon, regarding the candidate as the center of point symmetry. Then, the symmetrizing means make corrections to the coordinates of part or all of the vertexes necessary to symmetrize the input figure into an ideal point symmetric polygon with respect to the candidate regarded as the center of point symmetry.

An apparatus in a sixth aspect of the invention for shaping a polygon comprises:

an input means for inputting a figure;

a feature extraction means for extracting values of graphic features including coordinates of vertexes from said figure when said figure is detected as a polygon;

a vertex number judgment means for judging whether said figure is a polygon with an even number of vertexes or not from said values of graphic features extracted;

a candidate center calculation means for calculating, when a number of vertexes of said figure is detected to be 2n (n being an integer larger than one), coordinates of a candidate of a center of point symmetry of said figure on condition that said figure is a quasi point symmetric figure;

a symmetric point calculation means for calculating coordinates of n symmetric points of any n vertexes of said figure with respect to said candidate of a center of point symmetry;

a distance calculation means for calculating an average length of n line segments, each of said n line segment linking said symmetric point and an associated vertex of each of said any n vertexes when a (m+n)-th vertex (in case m is not larger than n) or a (m−n)-th vertex (in case m is larger than n) is defined as said associate vertex of m-th vertex from a vertex of said figure (m being an integer from one to 2n);

a symmetry discrimination means for judging whether said average length of n line segments is within a specified allowable range and, if so, setting said candidate as said center of point symmetry;

a symmetrizing means for modifying at least one of said values of graphic features for shaping said figure into a point symmetric polygon having a center thereof at said center of point symmetry; and an output means for outputting said point symmetric polygon after shaped.

In the sixth aspect, when a polygon having an even number of vertexes is input, the candidate center calculation means calculate coordinates of a candidate of a center of point symmetry of the input figure on condition that the figure is a quasi point symmetric figure. The symmetric point calculation means calculate coordinates of n symmetric points of any n vertexes of the figure with respect to the candidate of a center of point symmetry, in the same way as in the fifth aspect, and, here, the distance calculation means calculate an average length of n line segments linking the symmetric points of the n vertexes and their corresponding associated vertexes. Then, the symmetry discrimination means judge if the average lengths of the n line segments are within a specified allowable range or not and, if so, the symmetry discrimination means discriminate the input figure as a quasi point symmetric polygon, regarding the candidate as the center of point symmetry. Then, the symmetrizing means make corrections to the coordinates of part or all of the vertexes necessary to synmmetrize the input figure into an ideal point symmetric polygon with respect to the candidate regarded as the center of point symmetry.

As heretofore described, the apparatus for shaping a polygon of the invention can shape quasi point symmetric polygons of any type into ideal point symmetric polygons automatically without any user's intervention.

BRIEF DESCRIPTION OF THE DRAWINGS

The foregoing, further objects, features, and advantages of this invention will become apparent from a consideration of the following description, the appended claims, and the accompanying drawings in which the same numerals indicate the same or the corresponding parts.

DETAILED DESCRIPTION OF THE PREFERRED EMBODIMENTS

Now, embodiments of the present invention will be described in connection with the drawings.

Figure 1:
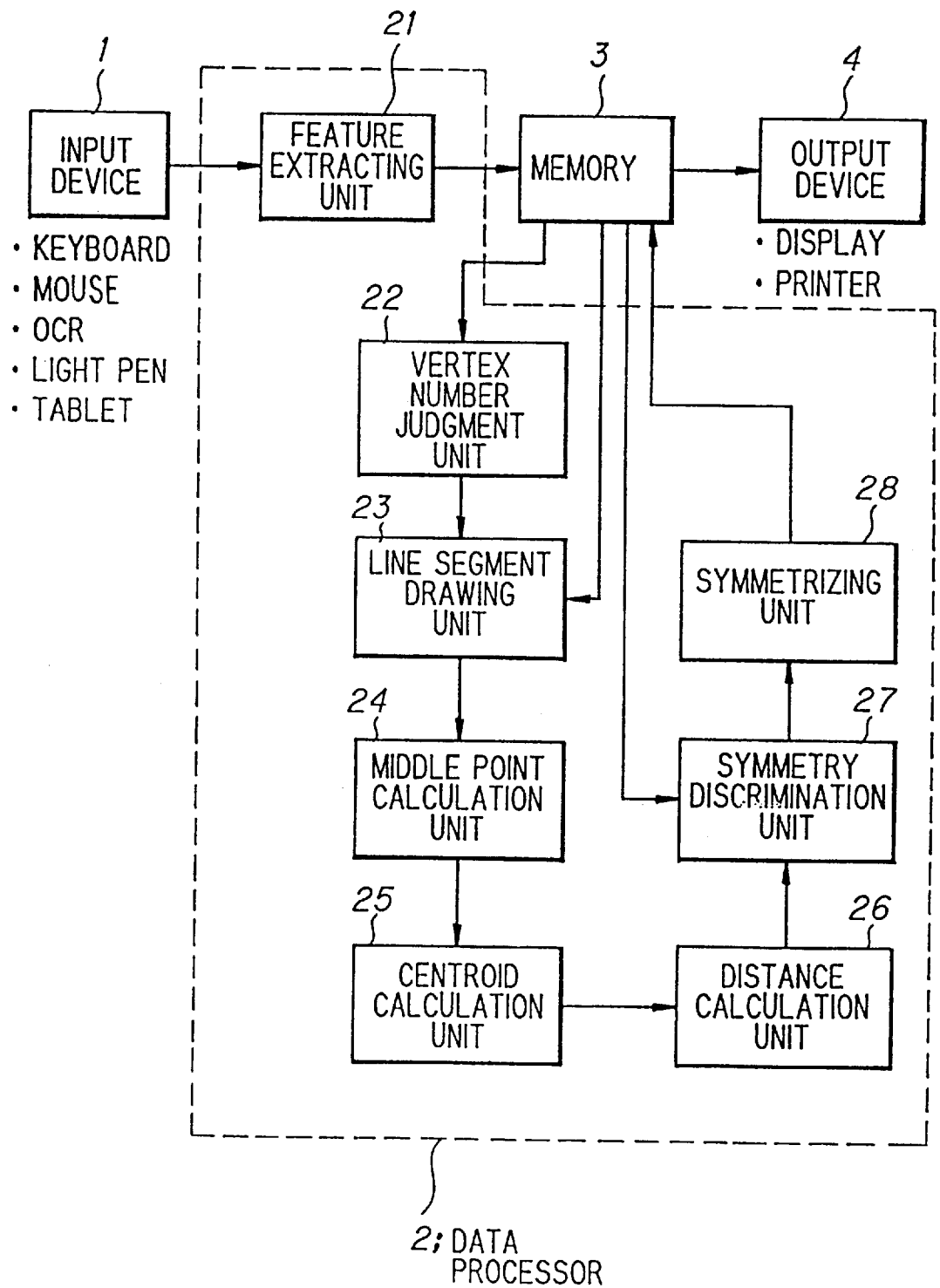
FIG. 1 is a block diagram of an apparatus for shaping a polygon of a first embodiment of the invention.

FIG. 1 is a block diagram illustrating a first embodiment of an apparatus for shaping a polygon, comprising an input device 1, a data processor 2, a memory 3 and an output device 4. The input device 1 may be a keyboard, a mouse, an OCR, a light pen, a tablet, or the like for inputting figures. The data processor 2 operates by program control. The memory 3 may be an external memory, a RAM, or the like for storing the values of features of the input figures and shaped figures, etc. The output device 4 may be a display, a printer, or the like for displaying or printing the figures.

When a polygonal figure quasi symmetric with respect to a point is input with certain accuracy or precision, even when it is hand-written, into the data processor 2, the data processor 2 automatically recognizes the features, and modifies or corrects them to shape the figure into a point symmetric polygon. For the purpose, the data processor 2 is provided with;

a feature extraction unit 21 for extracting values of graphic features from an input figure, a vertex number judgment unit 22 for checking the number of polygonal vertexes of the figure, a line segment drawing unit 23 for drawing line segments for symmetry judgment from values of the graphic features, a middle point calculation unit 24 for calculating the middle point of each of the line segments, a centroid calculation unit 25 for calculating a centroid of the middle points of the line segments, which may probably be the center of point symmetry of the figure if the figure is to be shaped into a point symmetric polygon, a distance calculation unit 26 for calculating the distance between the centroid and each of the middle points, a symmetry discrimination unit 27 for judging, from the distances between the centroid and the middle points, whether the figure is quasi symmetric around a point, and a symmetrizing unit 28 for shaping the figure by symmetrizing with respect to a point by making certain modifications to the values of features extracted when the symmetry discrimination unit 27 judges that the figure is quasi point symmetric.

These units are composed of hardware such as a CPU and peripheral LSIs, and software stored in a ROM, an external memory or the like.

The feature extraction unit 21 extracts features of straight lines and curves from an input figure, and judges if the figure is a polygon. If so, the feature extraction unit 21 accepts the figure, and extracts values of polygonal features of the figure, such as a number of vertexes, coordinates of the vertexes, lengths of the sides, and the interior angles. The extracted features are once stored in the memory 3 together with figure information such as the figure number. If the input figure is not judged as a polygon, it is rejected.

The vertex number judgment unit 22 checks the number of vertexes of the polygon from the extracted features stored in the memory 3, and judges if the polygon has an even number of vertexes.

Figure 4:
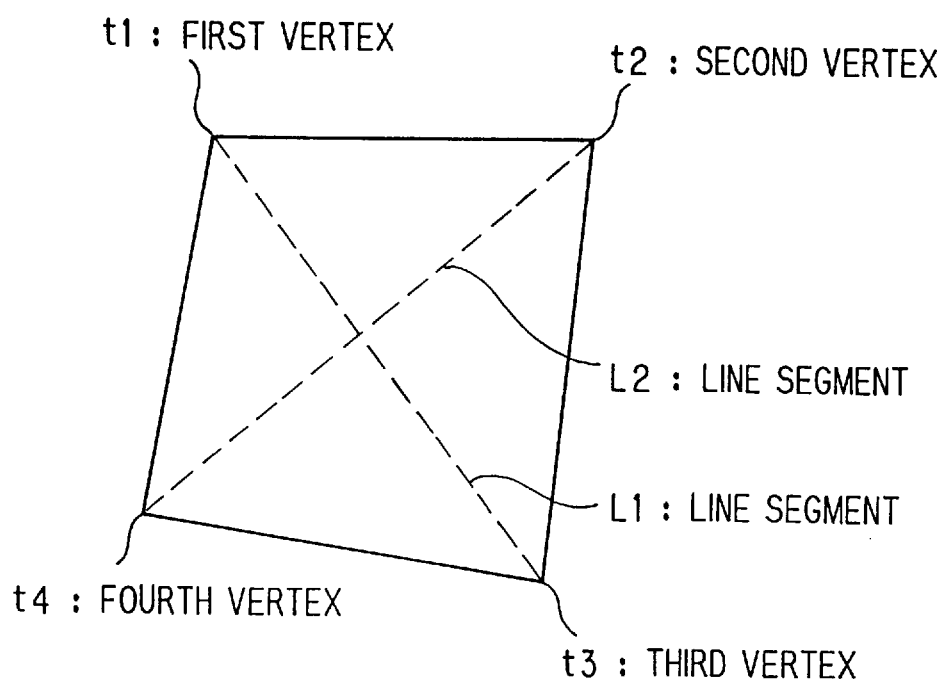
FIG. 4 shows another example of a polygon for the explanation.
Figure 6:
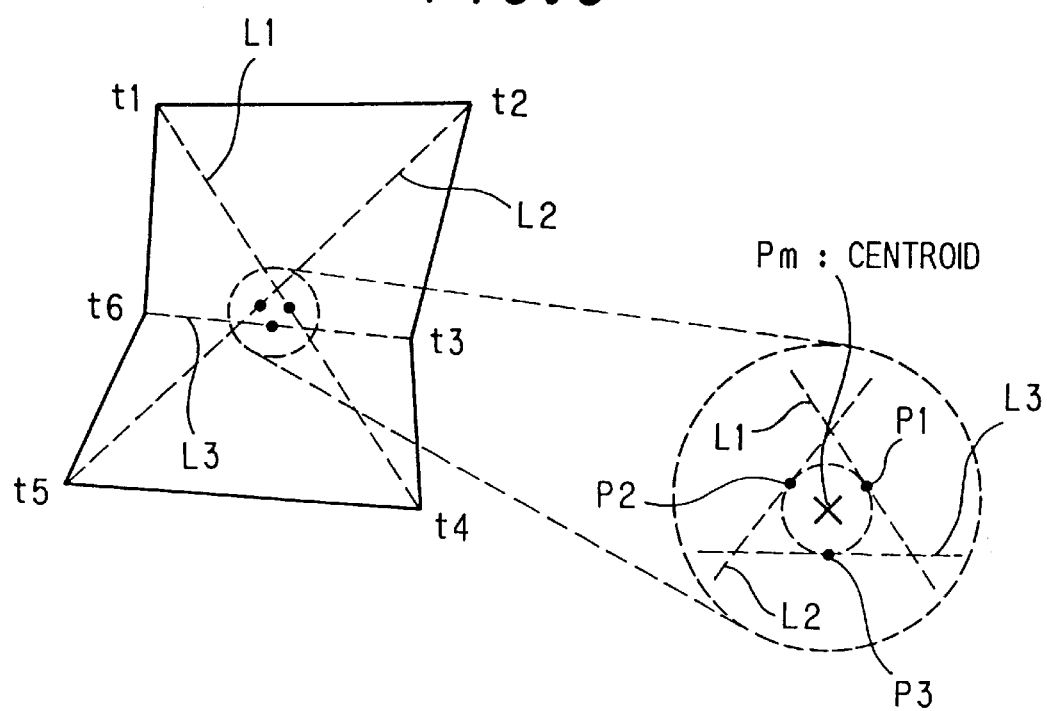
FIG. 6 shows still another example of a polygon for the explanation.

In order to judge whether the polygon is quasi point symmetric in case the polygon has an even number (2n: n being an integer larger than 1) of vertexes, the line segment drawing unit 23 sets any one of the vertexes of the polygon as a first vertex t1 as shown in FIGS. 4 and 6. The line segment drawing unit 23 then pairs a m-th (m: being an integer from 1 to n) vertex with an (m+n)-th vertex, counting from the first vertex t1 clockwise or counterclockwise. The line segment drawing unit 23 then draws a line segment for symmetry judgment between the vertexes of each pair.

Thus, n line segments for symmetry judgment, L1, L2, L3, . . . Ln are obtained when the polygon has 2n vertexes.

For example, if the polygon is a quadrangle as shown in FIG. 4, two line segments L1 and L2 are drawn between the vertexes t1 and t3, and the vertexes t2 and t4, respectively. If the polygon is a hexagon as shown in FIG. 6, three line segments L1, L2 and L3 are drawn between the vertexes t1 and t4, between the vertexes t2 and t5, and between the vertexes t3 and t6, respectively.

Figure 5:
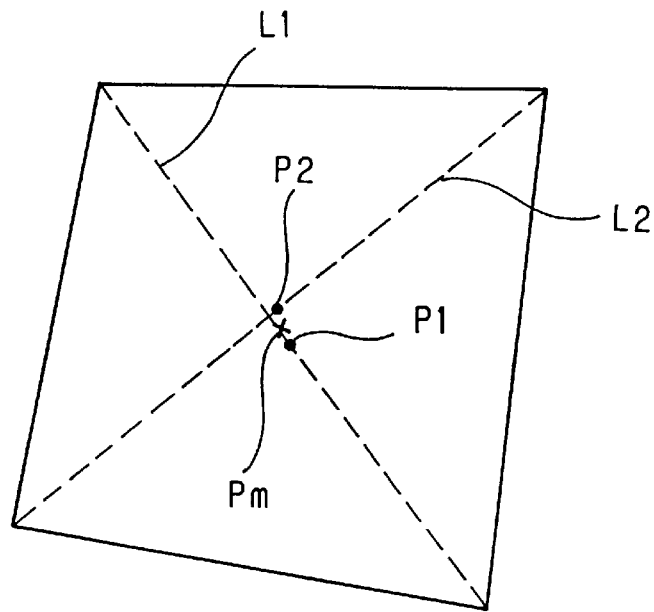
FIG. 5 shows still another example of a polygon for the explanation.

The middle point calculation unit 24 calculates coordinates of middle point P1, P2, P3, . . . of each line segment L1, L2, L3, . . . of FIG. 5 or FIG. 6.

The centroid calculation unit 25 calculates, from the coordinates obtained by the middle point calculation unit 24, a centroid Pm of the polygon, which may probably be the center of point symmetry if the polygon is quasi point symmetric.

For example, if the polygon is a quadrangle as shown in FIG. 5, two middle points P1 and P2 are obtained concerning two line segments L1 and L2 drawn for symmetry judgment. So, the centroid Pm is located on the middle point of a line segment linking the middle points P1 and P2. If the polygon is a hexagon as shown in FIG. 6, three line segments L1, L2 and L3 give three middle points P1, P2 and P3. In the case, coordinates of the centroid of the polygon equals to a centroid (xm, ym) of a triangle having three vertexes at the three middle points P1 (x1, y1), P2 (x2, y2) and P3 (x3, y3), coordinates (xm, ym) being represented by following equations (1) and (2).

$$xm=(x1+x2+x3)/3 \quad (1)$$

$$ym=(y1+y2+y3)/3 \quad (2)$$

As for a polygon with eight or more vertexes as well, the centroid Pm of the middle points can be obtained in the same way by a known method for calculating a centroid.

The distance calculation unit 26 calculates the distance between the centroid Pm and each middle point P1, P2, . . . on the basis of the results of calculation by the units middle point calculation 24 and the centroid calculation unit 25.

The symmetry discrimination unit 27 calculates, for the first, total length of sides of the polygon on the basis of the values of features extracted from the input figure. Then, the symmetry discrimination unit 27 multiplies the total length by a specified coefficient (0.05–0.1, for example), for obtaining an allowance (reference value for symmetry judgment). Then, the symmetry discrimination unit 27 judges if the distances between the centroid Pm and the middle points P1, P2, . . . are all in the allowance. If so, the symmetry discrimination unit 27 judges the polygon to be quasi point symmetric, and regards the centroid Pm as the center of point symmetry if the polygon. Regarding the centroid Pm as the center of point symmetry, the symmetrizing unit 28 corrects the coordinates of part or all of the vertexes to symmetrize the polygon with respect to the centroid Pm.

Figure 2:
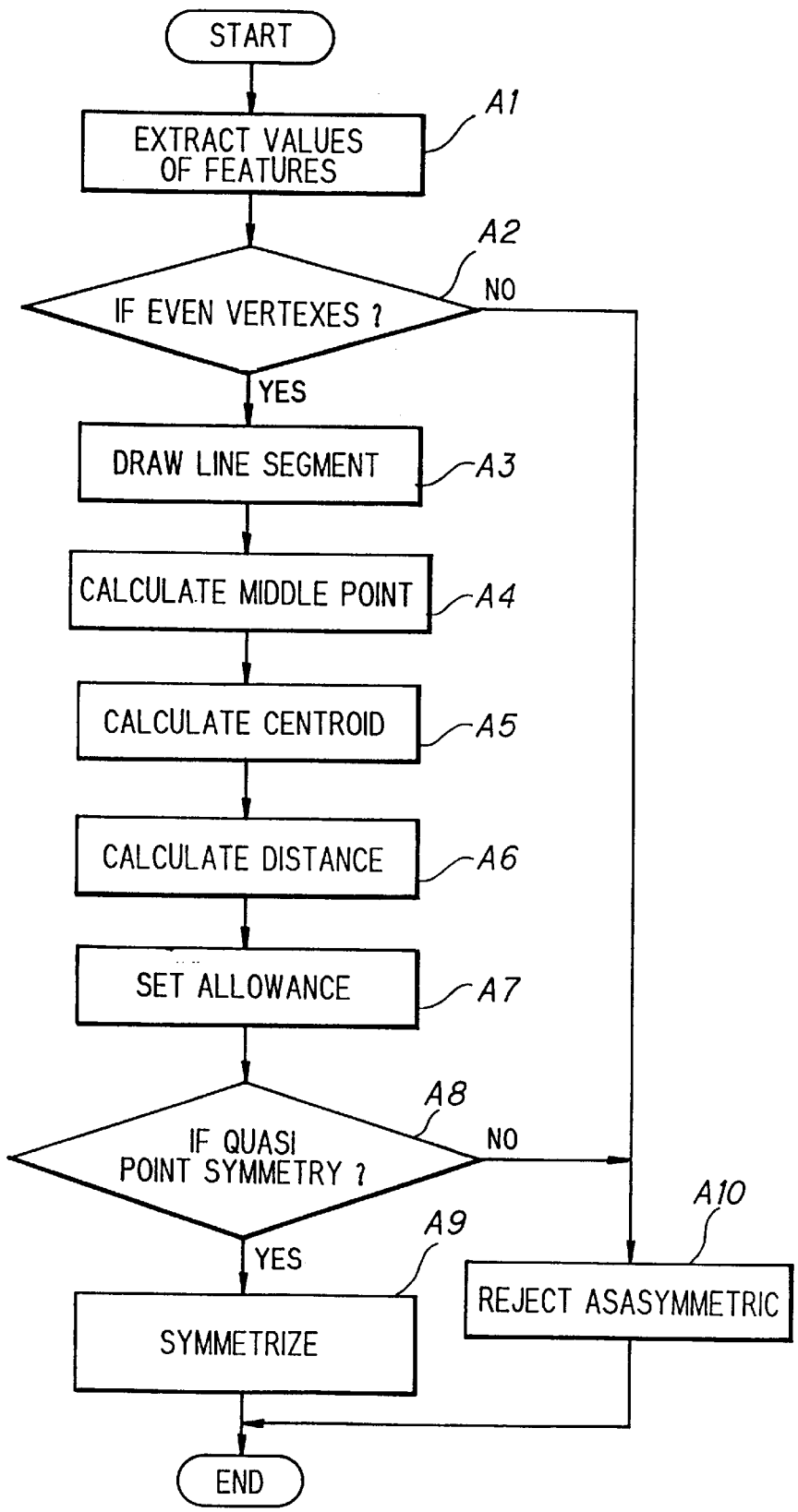
FIG. 2 is a flowchart showing processing operation of the apparatus shown in FIG. 1.

Now, the operation of the apparatus is explained below in detail with reference to the flowchart shown in FIG. 2.

Figure 3:
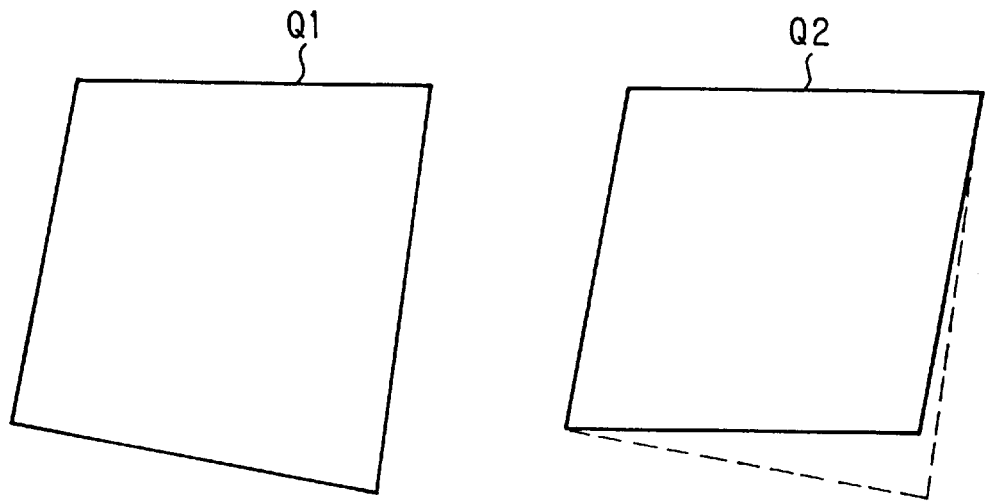
FIG. 3 shows examples of polygons referred to for an explanation of the shaping operation of the apparatus shown in FIG. 1.

Supplied from the input device 1 with the data of an input figure, such as a quadrangle Q1 of FIG. 3, the feature extraction unit 21 extracts the values of graphic features as a type of figure as to whether it is closed or open, types of lines as to whether they are straight or curved, a number of vertexes, coordinates of the vertexes, lengths of the sides, or interior angles from the figure at Step A1. Results of the extraction are stored once in a feature value storage area of the memory 3 together with figure information, such as the figure number.

At Step A2, the vertex number judgment unit 22 refers to the feature value storage area of the memory 3, and judges if a number of the vertexes are even or not. If the vertexes are odd in number, it is judged that the figure is not point symmetric, and the further shaping processes are omitted (Step A10). If the vertexes are even in number, as is the case with the quadrangle Q1 of FIG. 3, the line segment drawing unit 23 is started (Step A3).

At Step A3, the line segment drawing unit 23 sets, on the basis of the coordinates of vertexes stored in the feature value storage area of the memory 3, any one of the four vertexes of the figure as a first vertex t1, as shown in FIG. 4, and the other vertexes as a second, a third and a fourth vertexes t2, t3 and t4 respectively, in clockwise order form the first vertexes t1, and pairs the first and fourth vertexes t1 and t3 with each other, and the second and fourth vertexes t2 and t4 with each other. Then, the unit 23 draws line segments L1 and L2 for symmetry judgment between the first and the third vertexes t1 and t3, and between the vertexes t2 and t4, respectively.

Next at Step A4, the middle point calculation unit 24 calculates coordinates of the middle points P1 and P2 (FIG. 5) of the line segments L1 and L2, respectively. Thereafter at Step A5, the centroid calculation unit 25 calculates the centroid Pm on the basis of the coordinates of the middle points P1 and P2.

From the middle points P1 and P2, the centroid calculation unit 25 calculates coordinates of a centroid Pm. When the polygon is a quadrangle as the quadrangle Q1 of FIG. 3, the centroid is obtained as a middle point of the two middle points P1 and P2 since there are only two line segments L1 and L2 for symmetry judgment as shown in FIG. 5.

At Step A6, the distance calculation unit 26 calculates, from the results of calculation by the middle point calculation units 24 and the centroid calculation unit 25, distances between the centroid Pm and the middle points P1 and P2. At Step A7, the symmetry decision unit 27 calculates a total length of the sides of the figure on the basis of the values of the features extracted of the figure, multiplies the total length by a coefficient 0.05, for example, and sets the product of multiplication as the allowance (reference value for symmetry judgment). Next, at Step A8, the symmetry discrimination unit 27 judges if the figure is quasi point symmetric.

Here, it is judged whether the distances between the centroid Pm and middle points P1 and P2 are both in the allowance or not. If either of the distances exceeds the allowance, it is judged that the figure is not a point symmetric polygon at Step A10. If both of the distances are in the allowance, it is judged that the figure is a quasi point symmetric polygon, and it is decided that the centroid Pm shall be the center of point symmetry.

At Step A9, if the centroid Pm is decided as the center of point symmetry, the symmetrizing unit 28 makes necessary corrections to the coordinates of part or all of the vertexes to symmetrize the figure with respect to the centroid Pm.

There are various correcting methods. Coordinates of one or both of the vertexes of each pair may be corrected according to needs. In this embodiment, both vertexes are corrected equally. That is, coordinates of each vertex of a pair are corrected such that the distance between the centroid Pm and each of the corrected vertexes becomes average of the distances between the centroid Pm and the two vertexes P1 and P2.

The results of correction are stored as the values of features of the shaped figure in the memory 3 to be read out according to requests. Thus, the quadrangle Q1 of the input figure of FIG. 3 is shaped into a parallelogram Q1, as shown by the solid lines in FIG. 3, which is precisely symmetric around the centroid. The shaped figure is output from the output device 4.

As heretofore described, any type of polygon having an even number of vertexes can be shaped into a point symmetric polygon in the embodiment, by automatically extracting the center of point symmetry, as far as the original polygon is input with a certain accuracy or precision.

Now, a second embodiment of the invention will be described.

Figure 7:
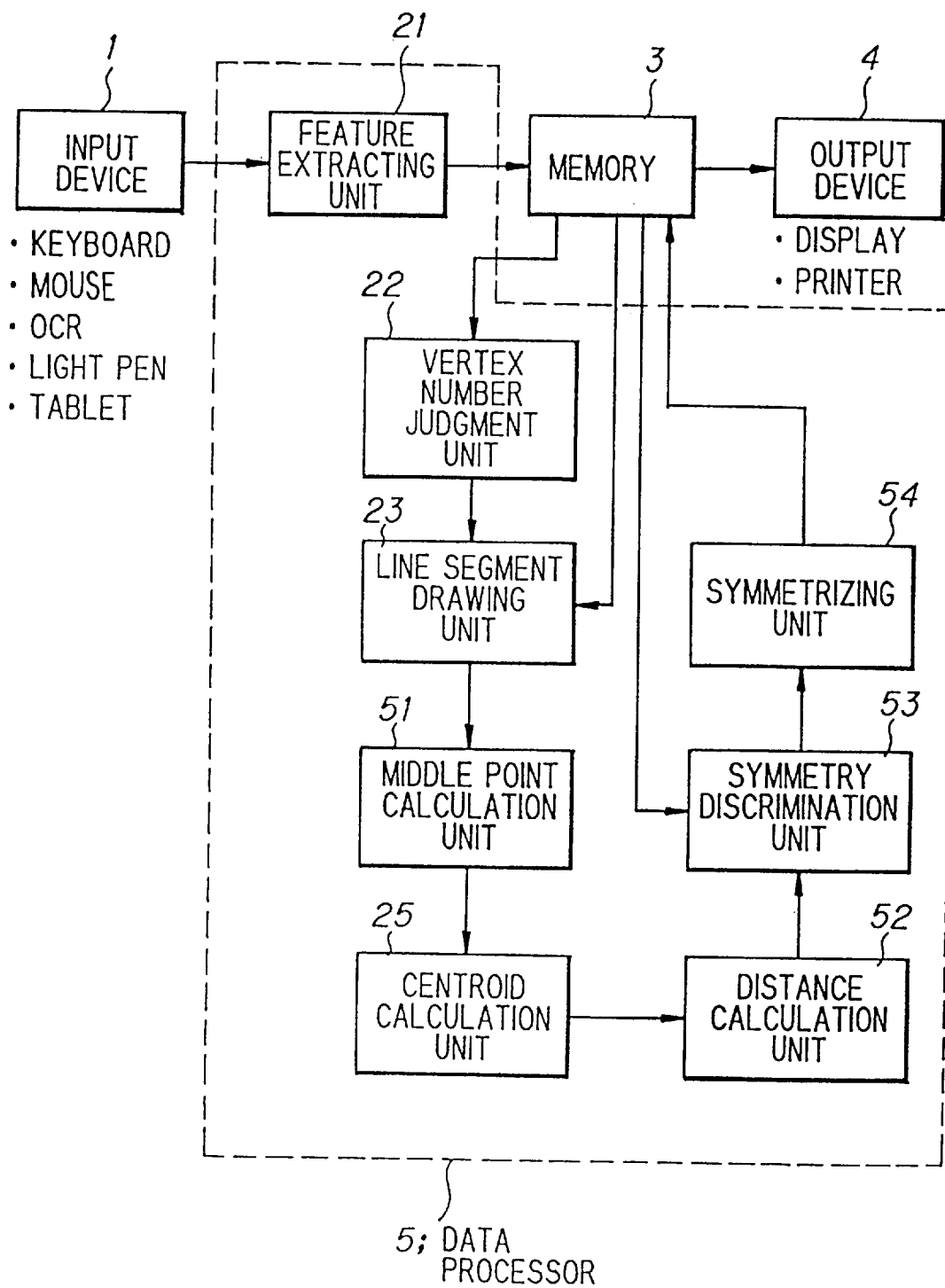
FIG. 7 is a block diagram illustrating a second embodiment of the invention.

FIG. 7 is a block diagram illustrating configuration of the second embodiment.

As shown in FIG. 7, the difference of the embodiment from the first embodiment lies in that the data processor 5 is provided with a different middle point calculation unit 51 which calculates coordinates of an average middle point in addition to coordinates of the middle points, replacing the middle point calculation unit 24 of FIG. 1, and a different distance calculation unit 52, replacing the distance calculation unit 26, for calculating the distance between the centroid and the average middle point.

In the embodiment, when a polygon having an even number 2n of vertexes is input as the input figure, the middle point calculation unit 51 calculates the coordinates of the middle points, which are n in number, of the line segments between the vertexes of the respective pairs in the same way as in the first embodiment. The unit 51 also calculates the coordinates of an average middle point which lies at an average position of the n middle points. The distance calculation unit 52 calculates the distance between the centroid Pm and the average middle point from these coordinates.

When a hexagon as shown in FIG. 6 is input as the input figure, for example, the middle point calculation unit 51 calculates the coordinates of middle points P1, P2 and P3 of line segments L1, L2 and L3 for symmetry judgment between vertexes t1 and t4, between vertexes t2 and t5, and between vertexes t3 and t6, respectively, of the hexagon and the coordinates of the average middle point Pm.

From the results of calculation performed by the middle point calculation unit 51, the centroid calculation unit 25 calculates the coordinates the centroid Pm of the middle points P1, P2 and P3 in the same way as in the first embodiment, and here in the second embodiment, the distance calculation unit 52 calculates a distance between the centroid Pm and the average middle point Pm. The symmetry decision unit 53 judges if the distance between the centroid and the average middle point is within a specified allowance or not. If so, the symmetry decision unit 53 judges the polygon to be quasi point symmetric, and decides that the centroid Pm shall be the center of point symmetry. When the centroid Pm is decided as the center of point symmetry, the symmetrizing unit 54 makes necessary corrections to the coordinates of part or all of the vertexes to precisely symmetrize the polygon with respect to the centroid Pm. The correcting method may be the same as that in the first embodiment. Otherwise, random numbers may be used so that, one of the vertexes of each pair may be corrected if a random number is odd, while the other vertex may be corrected if the random number is even. Except for the units above described, the setup of this embodiment is substantially the same as that of the first embodiment. So, the same components in FIG. 7 as in FIG. 1 are given the same numerals and duplicate descriptions are omitted.

Thus, in the second embodiment as well, similarly as in the first embodiment, any polygon having an even number of vertexes can be shaped into an intended point symmetric polygon, by automatically extracting the center of point symmetry, as far as the original polygon is input with certain accuracy or precision.

Now, a third embodiment of the invention illustrated in FIG. 8 will be described.

Figure 8:
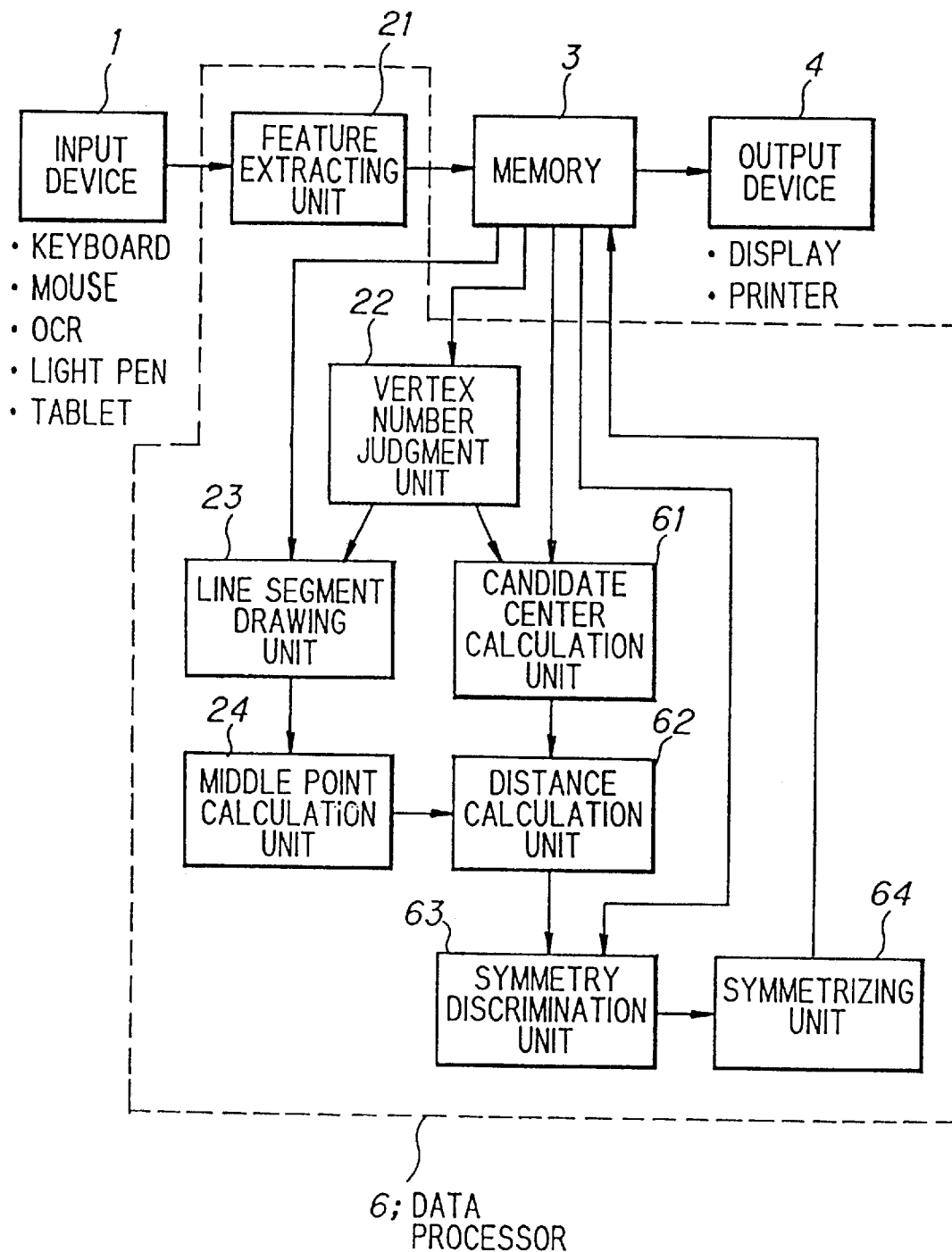
FIG. 8 is a block diagram illustrating a third embodiment of the invention.

As shown in FIG. 8, the data processor 6 of this embodiment is provided with a feature extraction unit 21 for extracting the values of graphic features of the input figure, a vertex number judgment unit 22 for checking the number of polygonal vertexes, a line segment drawing unit 23 for drawing line segments for symmetry judgment, and a middle point calculation unit 24 as well as in the first embodiment, and it is further provided with a candidate center calculation unit 61 for calculating coordinates of a candidate of a center of point symmetry of the input figure, a distance calculation unit 62 for calculating the distance between the candidate and middle points, a symmetry discrimination unit 63 for judging if the input figure is quasi point symmetric or not, and a symmetrizing unit 64 for precisely symmetrizing the input figure around the candidate.

In the third embodiment, when a polygon having an even number of vertexes is input, the candidate center calculation unit 61 calculates, from the values of features extracted from the input figure, the coordinates of a candidate of a center of point symmetry of the input figure, that is, a point which may probably be the center of point symmetry if the figure is quasi point symmetric.

The distance calculation unit 62 calculates a distance between the candidate of the center of point symmetry and each middle point of the line segments between the paired vertexes. The symmetry discrimination unit 63 judges if all the distances calculated by the distance calculation unit 62 are within a specified allowance or not. If so, the symmetry discrimination unit 63 decides that the candidate of the center of point symmetry shall be the center of point symmetry.

When the symmetry discrimination unit 63 decides that the candidate shall be the center of point symmetry, the symmetrizing unit 64 modifies at least a part of the values of features extracted according to coordinates of the candidate for shaping the figure into a point symmetric polygon with respect to the coordinate of the candidate.

Figure 9:
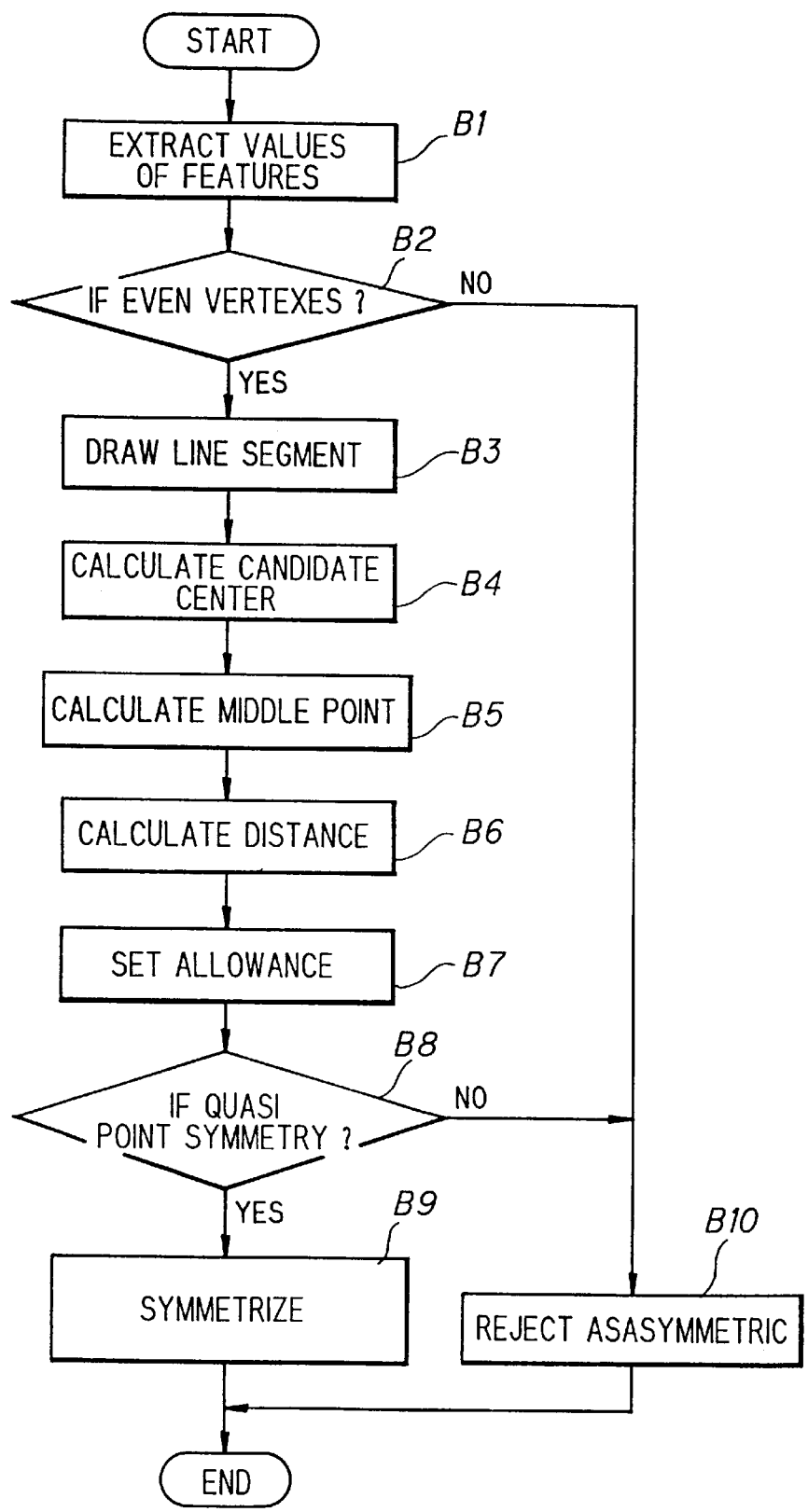
FIG. 9 is a flowchart showing processing operation of the apparatus shown in FIG. 8.

Now, the operation of the apparatus of the third embodiment is explained in detail with reference to the flowchart of FIG. 9.

Figure 10:
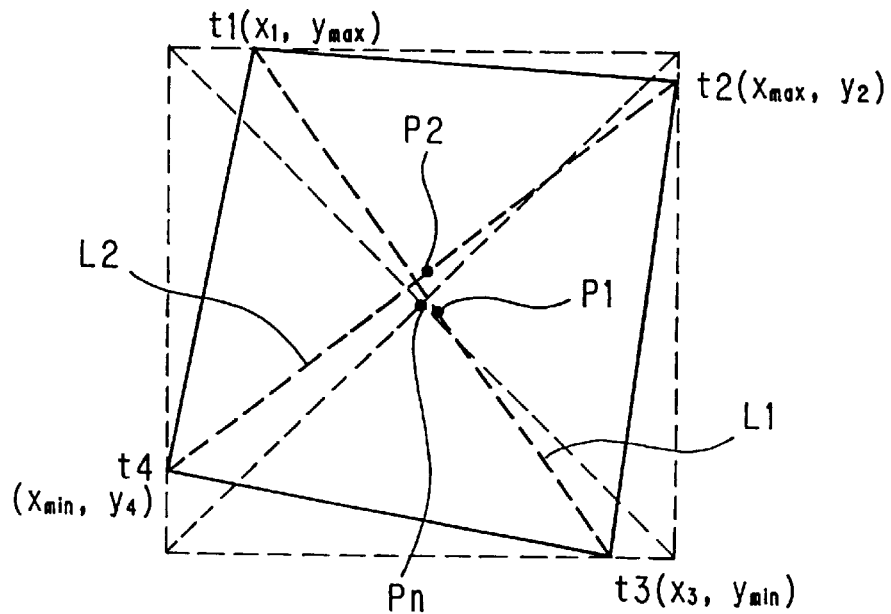
FIG. 10 shows an example of a polygon referred to for explanation of the shaping operation of the apparatus shown in FIG. 8.
Figure 11:
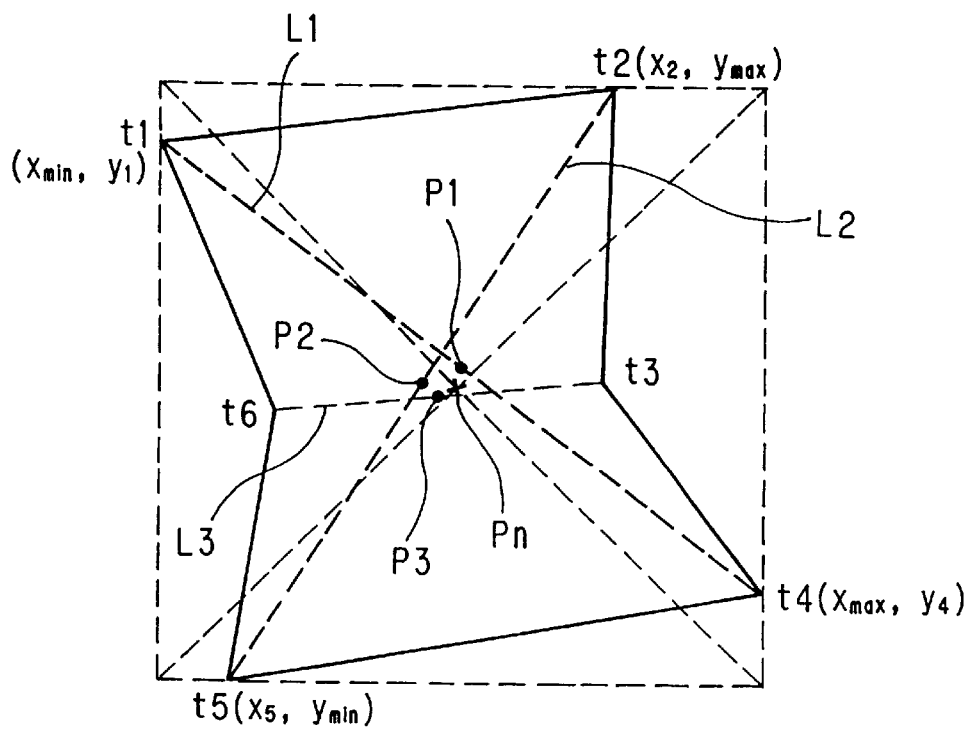
FIG. 11 shows another example of a polygon for the explanation.

Supplied from the input device 1 with the data of an input figure such as shown in FIG. 10 or 11, for example, the feature extraction unit 21 extracts the values of graphic features from the figure at Step B1. The values include types as to whether the figure is closed or open and whether lines are straight or curved, a number of vertexes, coordinates of the vertexes, lengths of sides of the figure, and interior angles. The results of extraction are stored once in a feature value storage area of the memory 3 together with figure information, such as the figure number.

At Step B2, the vertex number judgment unit 22 refers to the feature value storage area of the memory 3, and judges if the vertexes are even in number. If the vertexes are odd in number, it is judged that the figure is not point symmetric, and the further shaping process for point symmetry is omitted (Step B10). If the vertexes are even in number as is the case with FIG. 10 or FIG. 11, the line segment drawing unit 23 (Step B3) and the candidate center calculation unit 61 (Step B4) are started.

At Step B3, the line segment drawing unit 23 sets any one of the 2n (n being an integer larger than 1) vertexes of the figure as a first vertex t1, as shown in FIG. 10 or FIG. 11, on the basis of the coordinates of the vertexes stored in the memory 3. The line segment drawing unit 23 then pairs an m-th vertex (m being an integer from 1 to n) with an (m+n)-th vertex for each number of m, counting clockwise from the first vertex t1.

The line segment drawing unit 23 then draws a line segment for symmetry judgment between the vertexes of each pair. For example, if the figure is a quadrangle as shown in FIG. 10, two line segments L1 and L2 are drawn between vertexes t1 and t3, and between vertexes t2 and t4, respectively. If the figure is a hexagon as shown in FIG. 11, three line segments L1, L2 and L3 are drawn between vertexes t1 and t4, between vertexes t2 and t5, and between vertexes t3 and t6, respectively.

At Step B4, the candidate center calculation unit 61 calculates, from the stored coordinates of the vertexes, coordinates of a candidate Pn of the center of point symmetry, that is a point which should be the center of point symmetry of the figure if the figure is quasi point symmetric. a point.

The coordinate of the candidate Pn is calculated, in the embodiment, by finding a rectangle surrounded by;

a first straight line which is parallel to a y-axis of an orthogonal coordinate plane, and extends through a vertex (xmin, y) having a minimum x-coordinate value among vertexes of the figure, a second straight line which is parallel to the y-axis, and extends through a vertex (xmax, y) having a maximum x-coordinate value, a third straight line which is parallel to an x-axis of the coordinate plane, and extends through a vertex (x, ymin) having a minimum y-coordinate value, and a fourth straight line which is parallel to the x-axis, and extends through a vertex (x, ymax) having a maximum y-coordinate value.

The coordinates of the candidate Pn is calculated as coordinate of a center of the rectangle thus obtained as shown in FIG. 10 and FIG. 11.

Next, at Step B5, the middle point calculation unit 24 calculates the coordinates of the middle points P1, P2 . . . of the line segments L1, L2 . . . , respectively. At Step B6, the distance calculation unit 62 calculates distances between the candidate Pn of the center of point symmetry and the middle points P1, P2 . . . on the basis of the results of calculation by the middle point calculation unit 24 and the candidate center calculation unit 61.

Thereafter, at Step B7, the symmetry discrimination unit 63 calculates the total length of sides of the figure on the basis of the values of features stored, multiplies the total length by a specified coefficient, and sets the product of multiplication as an allowance. Then, at Step B8, the symmetry discrimination unit 63 judges if the figure is quasi point symmetric or not. Here, it is judged whether the distances between the candidate Pn of the center of point symmetry and the middle points P1, P2 . . . are all within the allowance.

If the distance between the point Pn and any one of the middle points exceeds the allowance, the figure is judged not to be a point symmetric polygon at Step B10.

If the distances between the point Pu and the points P1, P2 . . . are all within the allowance, it is judged that the figure is a quasi point symmetric polygon, and it is decided that the candidate Pn shall be the center of point symmetry.

At Step B9, when the candidate Pn is decided as the center of point symmetry, the symmetrizing unit 64 makes necessary corrections to the coordinates of one or more vertexes of the figure to precisely symmetrize the figure with respect to the candidate Pn decided as the center of point symmetry.

Thus, in the third embodiment as well, similarly in the first embodiment, any polygon having an even number of vertexes can be shaped into an intended point symmetric polygon, by automatically extracting the center of point symmetry, as far as the original polygon is input with certain accuracy or precision.

Now, a fourth embodiment of the invention illustrated in FIG. 12 will be described.

Figure 12:
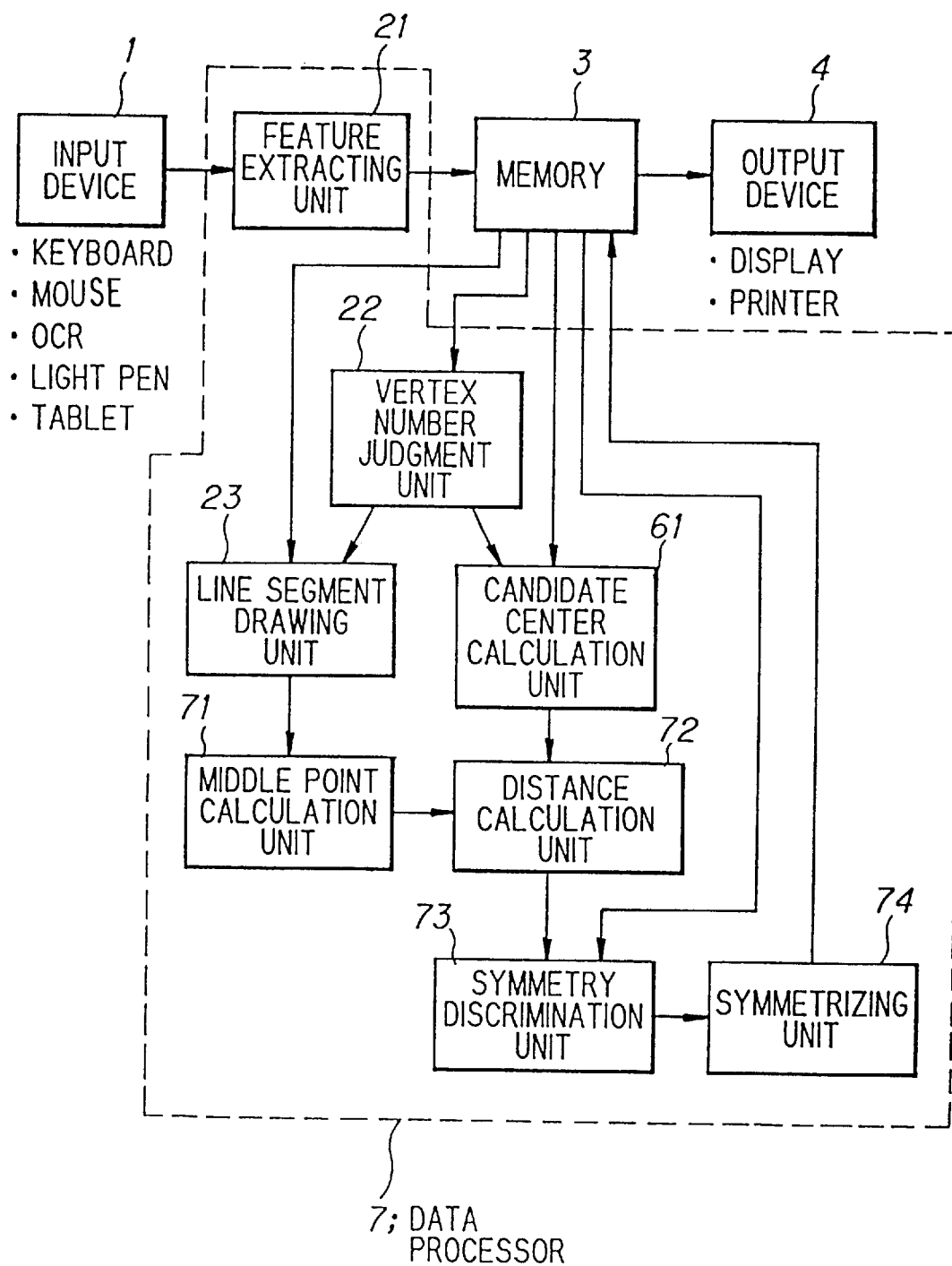
FIG. 12 is a block diagram of a fourth embodiment of the invention.

As shown in FIG. 12, a difference of the fourth embodiment from the third embodiment above described lies in that the data processor 7 is provided a different middle point calculation unit 71 for calculating an average middle point, in place of the middle point calculation unit 24 of FIG. 1, and a different distance calculation unit 72 for calculating distance between a candidate of a center of point symmetry and the average middle point, in place of the distance calculation unit 62 for calculating distances between the candidate and the middle points.

When a polygon having 2n vertexes is input as the input figure, the middle point calculation unit 71 calculates the coordinates of an average middle point which is the average position of the middle points of the n line segments for symmetry judgment extended between vertexes of n pairs. The distance calculation unit 72 calculates the distance between the candidates of the center of point symmetry and the average middle point.

In the embodiment, when a polygon having an even number of vertexes is input, the middle point calculation unit 71 calculates the coordinates of the average middle point of the middle points on the n line segments for symmetry judgment between the vertexes of n pairs.

From the values of graphic features extracted from the polygon, the candidate center calculation unit 61 calculates the coordinates of a candidate of a center of point symmetry of the input figure in a similar way as applied in the third embodiment, or by any other method. The distance calculation unit 72 calculates the distance between the candidate calculated and the average middle point.

The symmetry discrimination unit 73 judges if the distance between the candidate and the average middle point is within a specified allowance. If so, the symmetry discrimination unit 73 judges the polygon to be quasi point symmetric, and decides that the candidate shall be the center of point symmetry. On the basis of this decision, the symmetrizing unit 74 makes necessary corrections to the coordinates of part or all of the vertexes to precisely symmetrize the polygon with respect to the candidate decided as the center of point symmetry of the figure.

In the fourth embodiment as well, similarly in the third embodiment, any polygon having an even number of vertexes can be shaped into a point symmetric polygon, by automatically extracting the center of point symmetry, as far as the original polygon is input with certain accuracy or precision.

Now, a fifth embodiment of the invention illustrated in FIG. 13 will be described.

Figure 13:
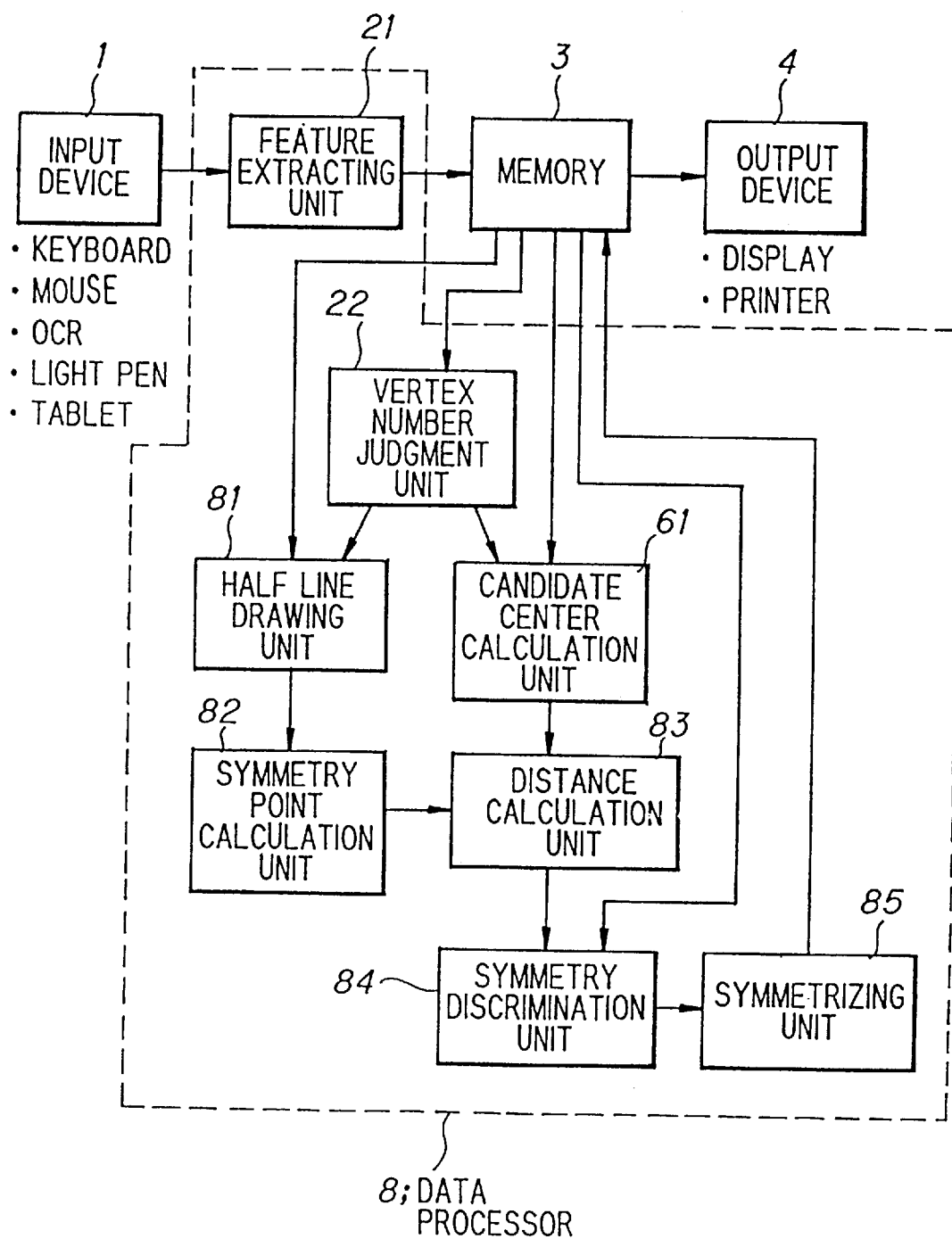
FIG. 13 is a block diagram of a fifth embodiment of the invention.

As shown in FIG. 13, the data processor 8 of this embodiment is provided with a feature extraction unit 21 for extracting the values of features, a vertex number judgment unit 22 for checking the number of polygonal vertexes, a candidate center calculation unit 61 for calculating coordinates of a candidate of the center of point symmetry of the figure as well as in the fourth embodiment, and here, further provided with a half line drawing unit 81, a symmetry point calculation unit 82, and a different distance calculation unit 83 for calculating distances between the symmetric points and associated vertexes, a different symmetry discrimination unit 84 for judging if a figure is quasi point symmetric, and a symmetrizing unit 85 for precisely symmetrizing the figure with respect to a point.

Figure 15:
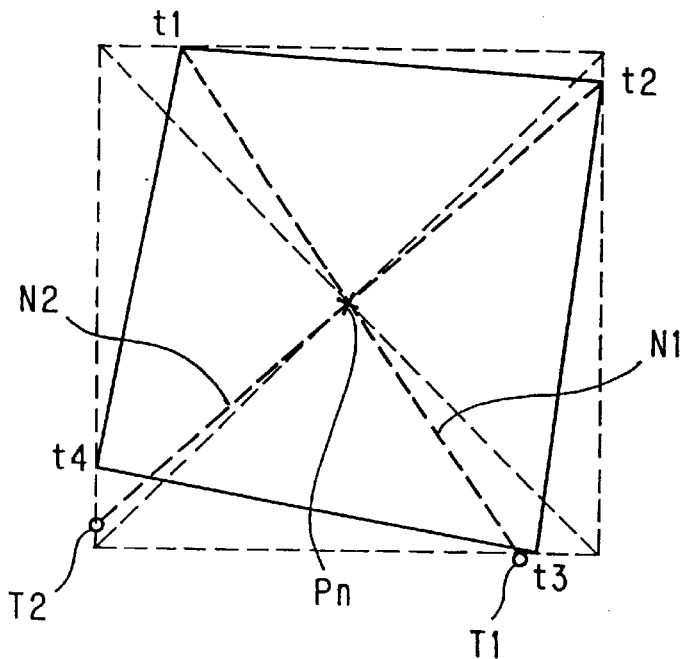
FIG. 15 shows an example of a polygon referred to for explanation of the shaping operation of the apparatus shown in FIG. 13.
Figure 16:
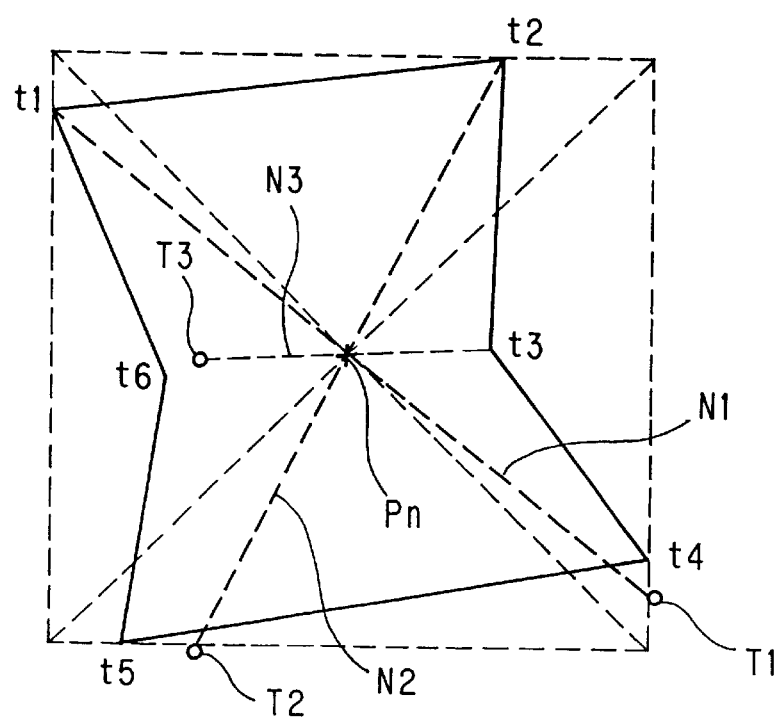
FIG. 16 shows another example of a polygon for the explanation.

When a polygon having an even number 2n (n being an integer larger than 1) of vertexes as shown in FIG. 15 or FIG. 16 is input, the half line drawing unit 81 sets any one of the 2n vertexes as a first vertex t1. The half line drawing unit 81 then pairs an m-th vertex (m being an inter from 1 to n) with an (m+n)-th vertex for each value of m, counting clockwise from the first vertex t1.

The half line drawing unit 81 then sets one of the vertexes of each pair as a start point (for example t1, t2 in FIG. 15 and t1, t2, t3 in FIG. 16), and the other as the associated vertex (t3, t4 in FIG. 15 and t4, t5, t6 in FIG. 16). Then, the half line drawing unit 81 draws a half line N1, N2 . . . starting from each of the start points, and extending through the candidate Pn of the center of point symmetry.

The symmetric point calculation unit 82 sets symmetric points T1, T2 . . . on each half line N1, N2 . . . , respectively, at a distance two times of the distance to the candidate Pn from each start point.

The symmetric point calculation unit 82 then calculates the coordinates of the symmetric points T1, T2 . . . in order, which are n in number. The distance calculation unit 83 calculates distances between each symmetric point (T1, T2 . . . ) and the associated vertexes (t3, t4 in FIG. 15 and t4, t5, t6 in FIG. 16).

Figure 14:
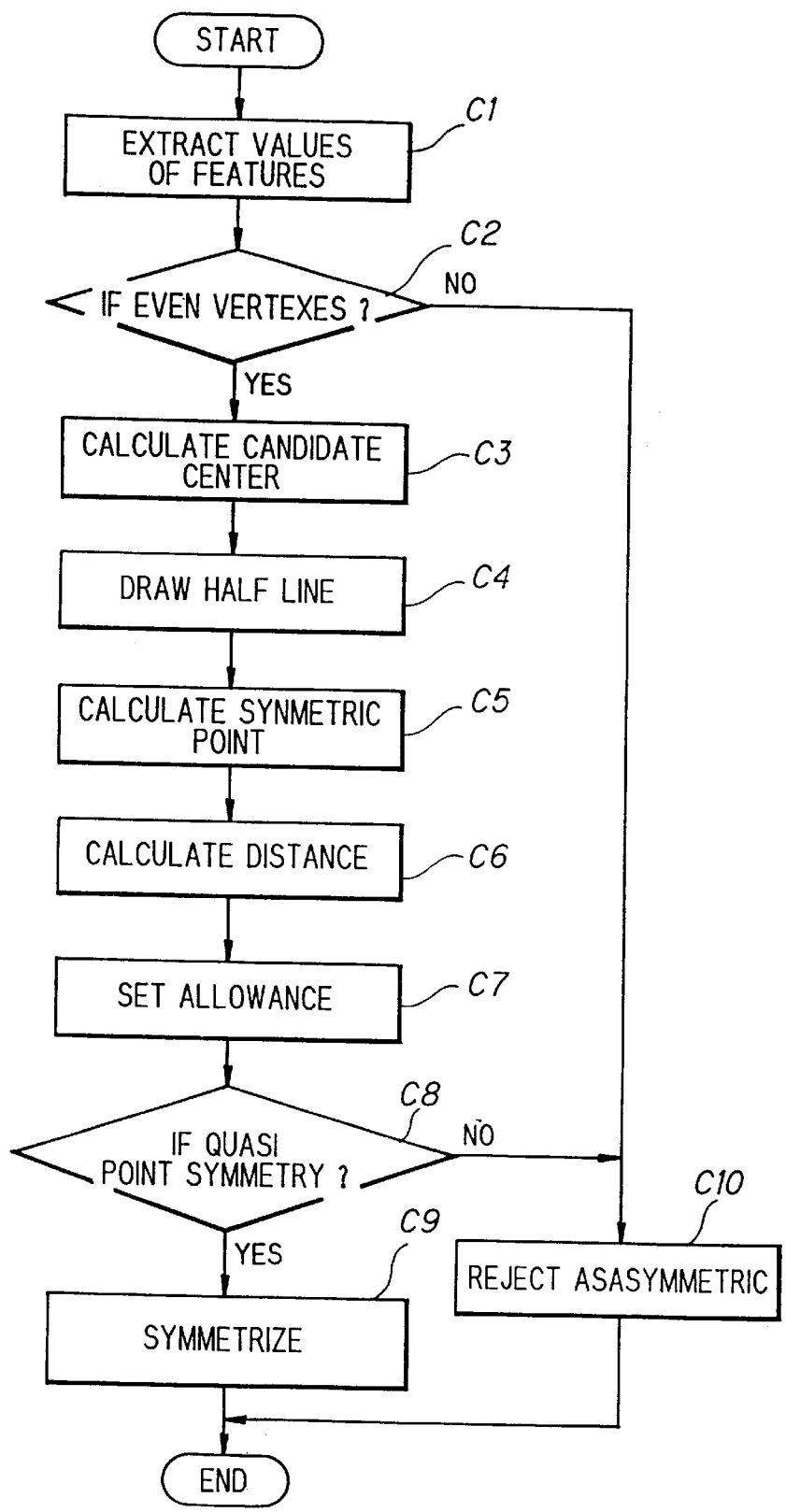
FIG. 14 is a flowchart showing processing operation of the apparatus shown in FIG. 13.

The operation of the apparatus of this embodiment is explained in detail with reference to the flowchart of FIG. 14.

Supplied from the input device 1 with the data of an input figure such as shown in FIG. 15 or FIG. 16, the feature extraction unit 21 extracts the values of graphic features from the figure at Step C1. The values include types as to whether the figure is closed or open and whether the lines are straight or curved, a number of vertexes, coordinates of the vertexes, lengths of sides, and interior angles of the figure. The results of extraction are stored once in the feature value storage area of the memory 3 together with figure information, such as the figure number, similarly to the embodiments heretofore described.

At Step C2, the vertex number judgment unit 22 refers to the feature value storage area, and judges if the vertexes are even in number. If the vertexes are odd in number, it is judged that the figure is not point symmetric, and the further shaping process for point symmetry is omitted (Step C10). If the vertexes are even in number as is the case with FIG. 15 or FIG. 16, the candidate center calculation units 61 (Step C3) and the half line drawing unit 81 (Step C4) are started.

At Step C3, the candidate center calculation unit 61 calculates, from the stored coordinates of the vertexes, coordinates of a candidate Pn of a center of point symmetry which may probably be the center of point symmetry if the figure is quasi point symmetric (in the same way with the third embodiment).

At Step C4, when the input figure is a quadrangle such as shown in FIG. 15, the half line drawing unit 81 pairs vertexes t1 and t3 with each other, and vertexes t2 and t4 with each other. Then, the half line drawing unit 81 sets one of the pair of vertexes t1 and t3, the vertex t1, for example, as a start point, and draws a half line N1 which extends from the start point t1 and through the candidate Pn of the center of point symmetry of the figure. Next, the half line drawing unit 81 sets one of another pair of vertexes t2 and t4, the vertex t2, for example, as another start point, and draws a half line N2 which extends from the start point t2 and through the point Pn.

If the figure is a hexagon as shown in FIG. 16, the half line drawing unit 81 pairs vertexes t1 and t4 with each other, vertexes t2 and t5 with each other, and vertexes t3 and t6 with each other.

Then, the half line drawing unit 81 sets one of a pair of vertexes t1 and t4 the vertex t1, for example, as a start point, and draws a half line N1 which extends from the start point t1 and through the candidate Pn of the center of point symmetry of the figure. Next, the half line drawing unit 81 sets one of another pair of vertexes t2 and t5, the vertex t2, for example, as another start point, and draws a half line N2 which extends from the start point t2 and through the point Pn, and further, the half line drawing unit 81 sets one of the pair of vertexes t3 and t6, the vertex t3, for example, as a further start point, and draws a half line N3 which extends from the start point t3 and through the candidate Pn.

At Step C5, if the figure is a quadrangle as shown in FIG. 15, the symmetric point calculation unit 82 sets, as a symmetric point T1, a point on the half line N1 at a distance from the vertex t1 which is double of the distance between the vertex t1 and the candidate Pn of the center of point symmetry. Next, the symmetric point calculation unit 82 sets, as another symmetric point T2, a point on the half line N2 at the distance from the vertex t2 which is double of the distance between the vertex t2 and the candidate Pn. If the figure is a hexagon as shown in FIG. 16, the symmetric point calculation unit 82 sets, as a symmetric point T1, a point on the half line N1 at a distance from the vertex t1 which is double of the distance between the vertex t1 and the candidate Pn of the center of point symmetry. Next, the symmetric point calculation unit 82 sets, as another symmetric point T2, a point on the half line N2 at a distance from the vertex t2 which is double of the distance between the vertex t2 and the candidate Pn. Further, the symmetric point calculation unit 82 sets, as a further symmetric point T3, a point on the half line N3 at a distance from the vertex t3 which is double of the distance between the vertex t3 and the candidate Pn.

Next, at Step C6, the distance calculation unit 83 calculates, from the coordinates of each associated vertex (a vertex opposite to each start point) stored in the feature value storage area of the memory 3, and the results of calculation by the symmetric point calculation unit 82, a distance between each symmetric point (T1, T2 . . . ) and the associated vertex (t3, t4 in FIG. 15 and t4, t5, t6 in FIG. 16). Thereafter, at Step C7, the symmetry discrimination unit 84 calculates a total length of sides of the figure on the basis of the values of features extracted from the figure, multiplies the length by a specified coefficient, and sets the product of multiplication as an allowance.

Next, at Step C8, the symmetry decision unit 84 judges if the figure is quasi point symmetric. Then, it is judged whether distances between the symmetric points and associated vertexes are all within the allowance. If any one of these distances exceeds this value, it is judged that the figure is not a point symmetry polygon which is symmetric around a point (Step C10).

If the distances between the symmetric points and associated vertexes are all within the allowance, it is judged that the figure is a quasi point symmetric polygon, and it is decided that candidate Pn shall be the center of point symmetry of the figure.

At Step C9, when the candidate Pn is decided as the center of point symmetry, the symmetrizing unit 85 makes necessary corrections to the coordinates of one or more vertexes of the figure to precisely symmetrize the figure with respect to the candidate Pn decided as the center of point symmetry.

Thus in the fifth embodiment as well, similarly to that of the first embodiment, any polygon having an even number of vertexes can be shaped into an intended point symmetric polygon, by automatically extracting the center of point symmetry, as far as the original polygon is input with certain specified accuracy or precision.

Now, a sixth embodiment of the invention illustrated in FIG. 17 will be described.

Figure 17:
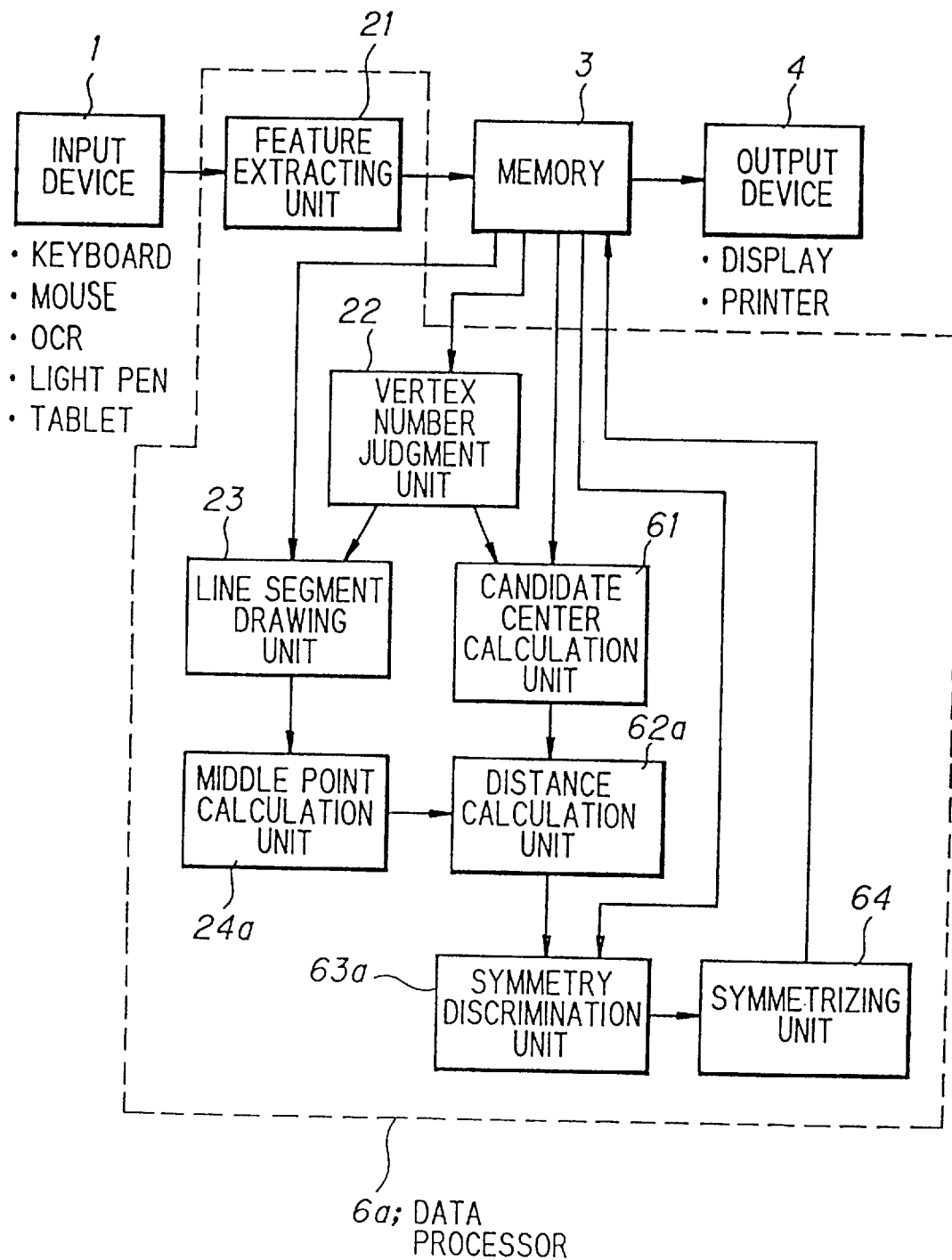
FIG. 17 is a block diagram of a sixth embodiment of the invention.

As shown in FIG. 17, the data processor 6a of this embodiment is provided with a feature extraction unit 21 for extracting the values of features of an input figure, a vertex number judgment unit 22 for checking the number of polygonal vertexes, a line segment drawing unit 23 for drawing a line segment for symmetry judgment, a middle point calculation unit 24a for sequentially calculating middle points, a candidate center calculation unit 61 for calculating a candidate of the center of point symmetry, a distance calculation unit 62a for sequentially calculating the distances between the candidate and the middle points, a symmetry discrimination unit 63a for sequentially judging if a figure is quasi point symmetric, and a symmetrizing unit 64 for precisely symmetrizing the figure with respect to a point.

In the third embodiment, the symmetry discrimination unit 63 (FIG. 8) judges if an input figure is quasi point symmetric after calculating the distances between the candidate Pn and the middle points on all the n line segments for symmetry judgment, when the figure is a polygon having 2n vertexes. However, in the data processor 6a (FIG. 17) of the sixth embodiment, the symmetry discrimination unit 63a judges if the input figure is quasi point symmetric after each calculation of the distance between the candidate and the middle points of the n line segments.

For the purpose, the data processor 6a is provided with, in place of the middle point calculation unit 24 (FIG. 8), a different middle point calculation unit 24a for sequentially calculating middle points to find and output the middle points one by one of the line segments for symmetry judgment and, in place of the distance calculation unit 62 (FIG. 8), a different distance calculation unit 62a for sequentially calculating distances between the candidate and the middle points to find and output the distances one by one.

Figure 18:
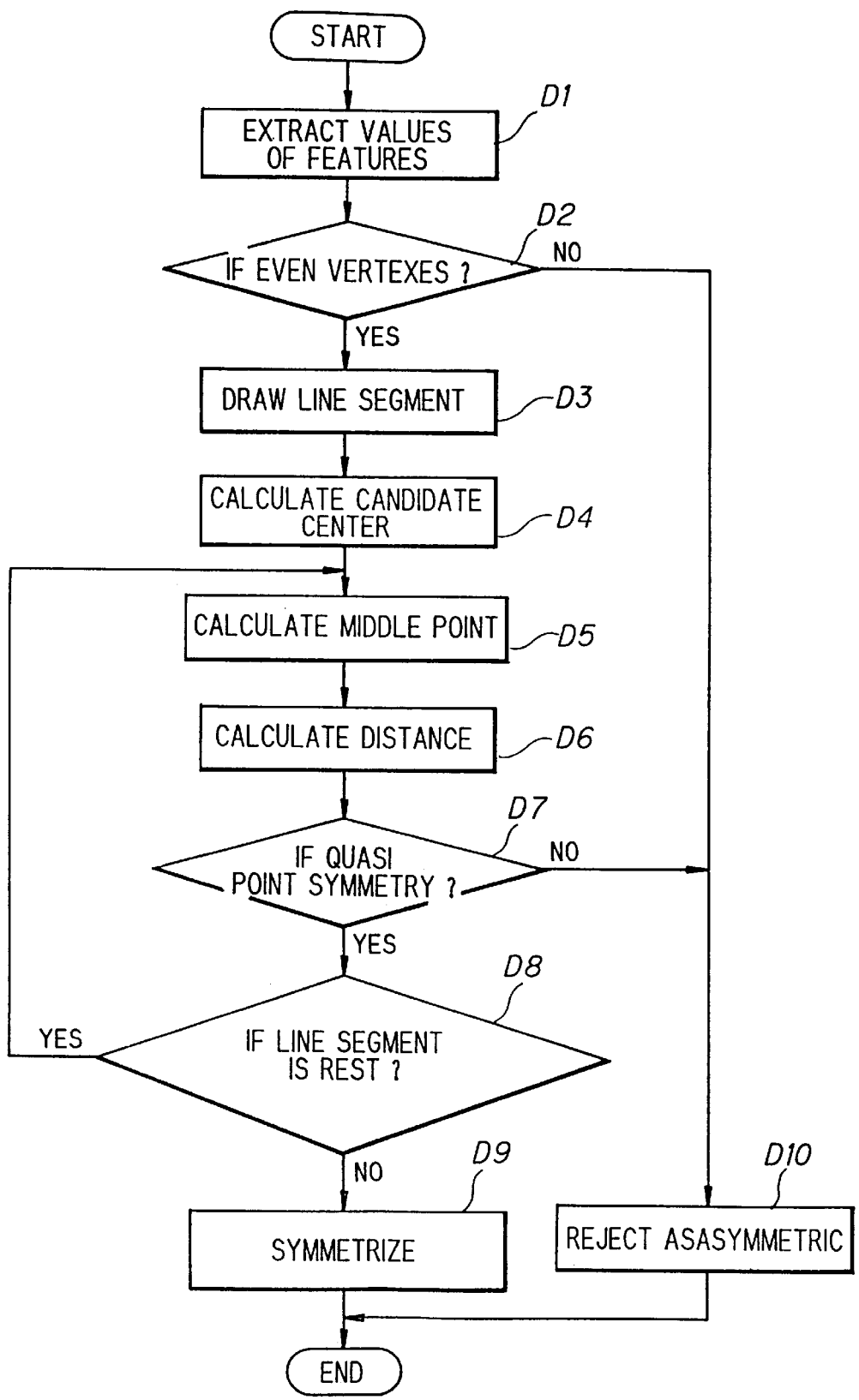
FIG. 18 is a flowchart showing processing operation of the apparatus shown in FIG. 17.

The operation of the apparatus of this embodiment is explained in detail with reference to the flowchart of FIG. 18.

Supplied from the input device 1 with the data of an input figure, the feature extraction unit 21 extracts the values of graphic features from the figure at Step D1. The values include types as to whether the figure is closed or open and whether lines are straight or curved, a number of vertexes, coordinates of the vertexes, lengths of the sides, and interior angles of the figure.

The results of extraction are stored once in the feature value storage area of the memory 3, together with figure information, such as the figure number. At Step D2, the vertex number judgment unit 22 refers to the feature value storage area, and judges if the vertexes of the figure are even in number. If the vertexes are odd in number, it is judged that the figure is not quasi point symmetric, and the further shaping process for point symmetry is omitted (Step D10).

If the vertexes are even in number, the line segment drawing units 23 (Step D3) and the candidate center calculation unit 61 (Step D4) are started. At Step D3, the line segment drawing unit 23 draws, on the basis of the stored coordinates of the vertexes, a line segment for symmetry judgment between vertexes of each pair.

At Step D4, the candidate center calculation unit 61 calculates, from the stored coordinates of the vertexes, the coordinates of a candidate Pn of the center of point symmetry which may probably be the center of point symmetry if the figure is quasi point symmetric, in the same way as in the third embodiment.

Thereafter, at Step D5, the middle point calculation unit 24a calculates the middle point of one, in specified order, of the line segments for symmetry judgment, and outputs the result of calculation to the distance calculation unit 62a. At Step D6, the distance calculation unit 62a, supplied with the value of the middle point on one of the line segments from the middle point calculation unit 24a, calculates the distance between the candidate Pn and the middle point, and sends the result of calculation to the symmetry discrimination unit 63a.

At Step D7, the symmetry discrimination unit 63a judges if the distance between the candidate and the middle point is within the specified allowance stored in advance in the memory 3.

If the distance exceeds the allowance, it is judged that the figure is not point symmetric (Step D10). If the distance is within the allowance, the process goes to Step D8, where it is judged whether there is any line segment for symmetry judgment of which the distance between the candidate Pn and the middle point has not been yet calculated. If there is rest a line segment, the process goes back to Step D5, where the middle point calculation unit 24a is caused to calculate coordinates of a next middle point.

By repeating such a process, the distances between the candidate Pn and the middle points are calculated for all the line segments and, if all the distances are within the allowance, the input figure is judged to be a point symmetric polygon, while the candidate Pn is decided as the center of point symmetry.

At Step D9, if the candidate Pn is decided as the center of point symmetry, the symmetrizing unit 64 makes necessary corrections to the coordinates of one or more vertexes of the figure to precisely symmetrize the figure with respect to the candidate Pn decided as the center of point symmetry of the figure.

Thus, in the sixth embodiment as well, similarly to that of the first embodiment, any polygon having an even number of vertexes can be shaped into an intended point symmetric polygon, by automatically extracting the center of point symmetry, as far as the original polygon is input with certain accuracy or precision.

Furthermore, according to this embodiment, it is possible to exclude earlier the input figures which are not point symmetric, so that the processing speed is higher than that of the third embodiment.

Figure 19:
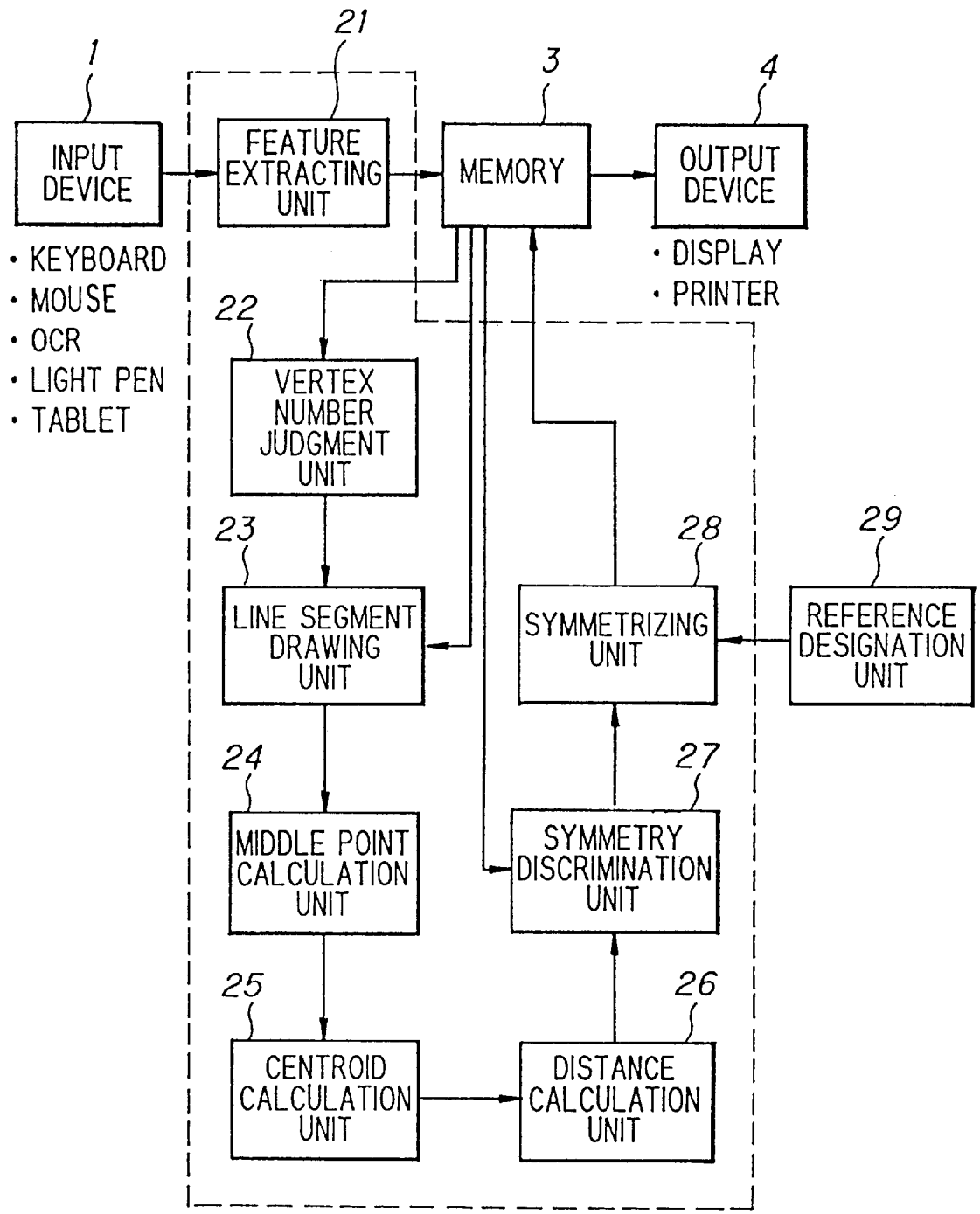
FIG. 19 is a block diagram of a seventh embodiment of the invention.
Figure 20:
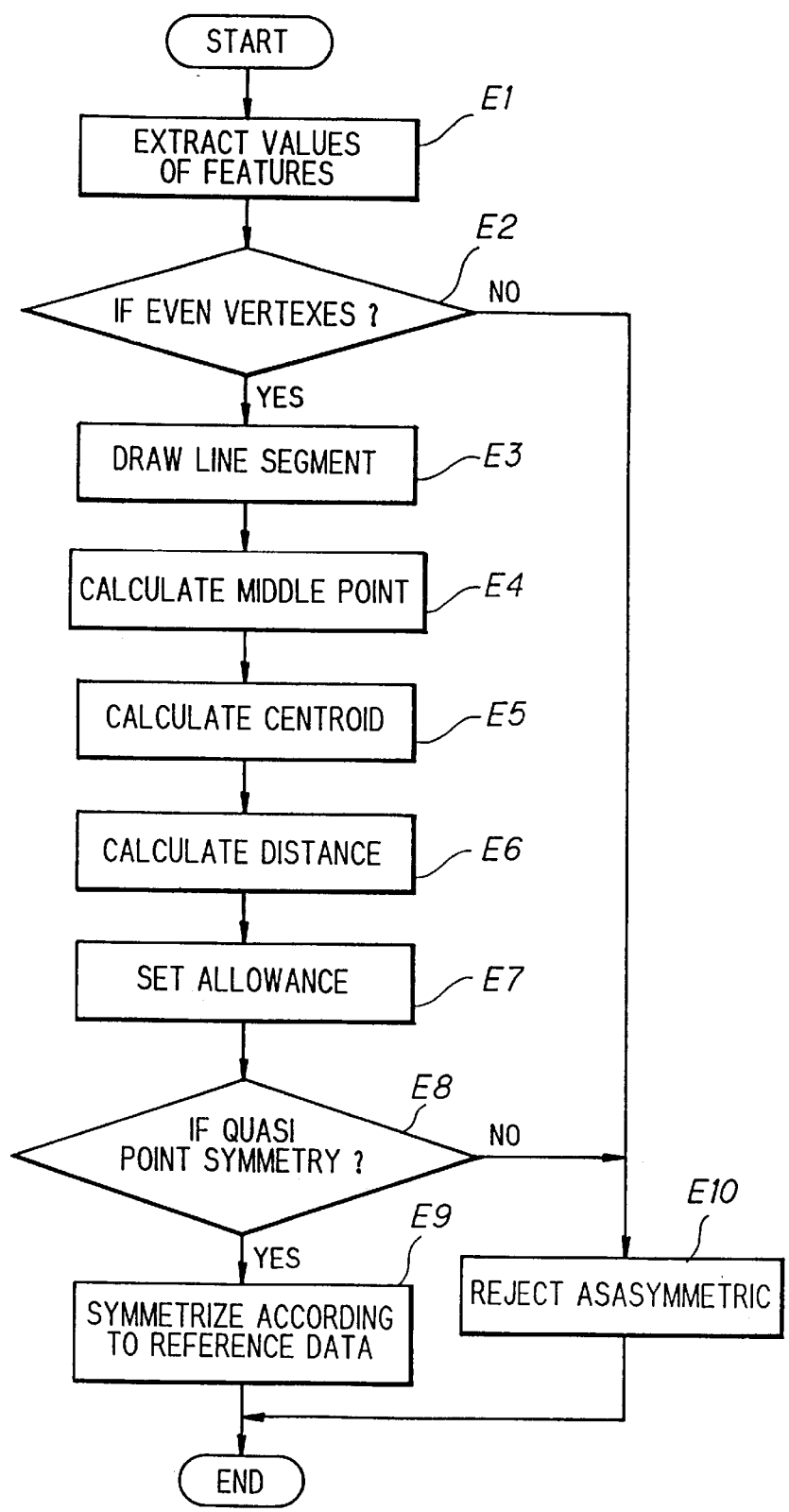
FIG. 20 is a flowchart showing processing operation of the apparatus shown in FIG. 19.
Figure 21:
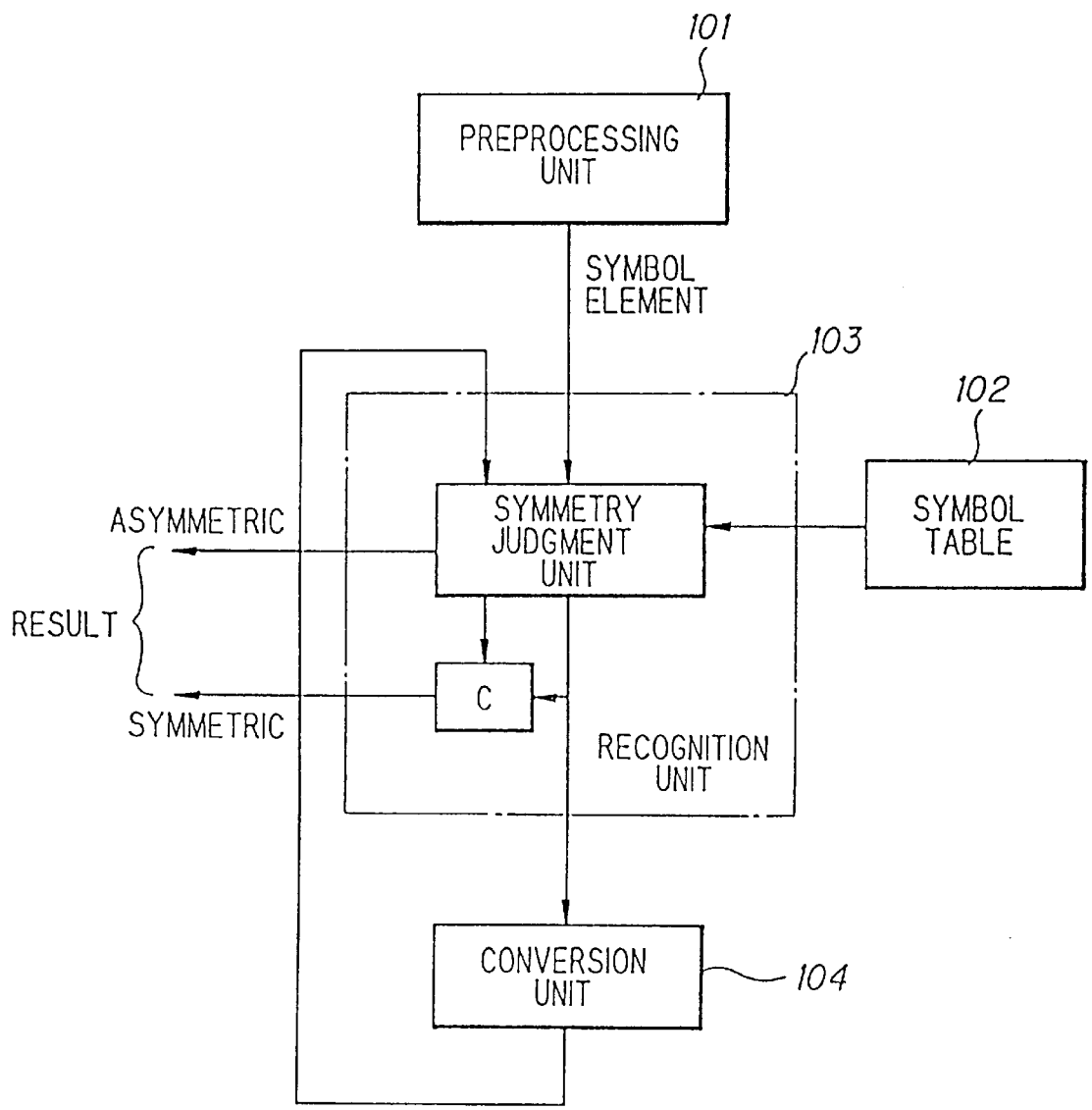
FIG. 21 is a block diagram of a conventional apparatus for shaping a figure.

Now, a seventh embodiment of the invention illustrated in FIG. 19 is described. Operation process of the embodiment is shown in a flowchart of FIG. 20.

As shown in FIG. 19, the setup of this embodiment is similar to that of the first embodiment (FIG. 1), but further provided with a reference designation unit 29 for designating reference elements for point symmetry shaping (Step E9). For example, a reference element designates either of two vertexes of a line segment for symmetry judgment, coordinate of which the shaping process should be based on. According to the setup of this embodiment, it is possible to designate the reference elements of the values of features when symmetrizing a figure with respect to a point. So, it is possible to input or output a figure for symmetrizing according to user's needs.

Heretofore, several embodiments of the present invention is described in details, but it is apparent that there can be a various modifications applicable in the scope of the invention.

For example, the method for calculating a candidate of the center of point symmetry is not limited to those described in the embodiments. Further, it is still possible to use the first and second embodiments or the third and the fourth embodiments together with each other, in order to judge from two aspects if an input figure is quasi point symmetric.

Still further, the fifth embodiment may be modified so as to calculate an average of the distances between the symmetric points and associated vertexes, and judge if the figure is quasi point symmetric, according to whether the average is within a specified allowance.

What is claimed is:

1. An apparatus for shaping a polygon, comprising:
   an input means for inputting a figure;
   a feature extraction means for extracting values of graphic features including coordinates of vertexes from said figure when said figure is detected as a polygon;
   a vertex number judgment means for judging whether said figure is a polygon with an even number of vertexes or not from said values of graphic features extracted;
   a middle point calculation means for calculating, when a number of vertexes of said figure is detected to be 2n, n being an integer larger than one, coordinates of each middle point of n line segments, each of said n line segments linking m-th vertex and (n+m)-th vertex from a vertex of said figure, m being an integer from one to n;
   a centroid calculation means for calculating coordinates of a centroid of said middle points from said coordinates of each of said middle points;
   a distance calculation means for calculating a distance between said centroid and each of said middle points;
   a symmetry discrimination means for judging whether all of said distances between said centroid and each of said middle points are within a specified allowable range and, if so, setting said centroid as a center of point symmetry of said figure;
   a symmetrizing means for modifying at least one of said values of graphic features for shaping said figure into a point symmetric polygon having a center thereof at said center of point symmetry; and
   an output means for outputting said point symmetric polygon after shaping.

2. An apparatus for shaping a polygon recited in claim 1, wherein said symmetry discrimination means calculate said specified allowable range on the basis of said values of graphic features extracted from the figure.

3. An apparatus for shaping a polygon, comprising:
   an input means for inputting a figure;
   a feature extraction means for extracting values of graphic features including coordinates of vertexes from said figure when said figure is detected as a polygon;
   a vertex number judgment means for judging whether said figure is a polygon with an even number of vertexes or not from said values of graphic features extracted;
   a middle point calculation means for calculating, when a number of vertexes of said figure is detected to be 2n, n being an integer larger than one, coordinates of each middle point of n line segments, each of said n line segments linking m-th vertex and (n+m)-th vertex from a vertex of said figure, m being an integer from one to n and calculating coordinates of an average middle point from average values of coordinates of each of said middle points;
   a centroid calculation means for calculating coordinates of a centroid of said middle points from said coordinates of each of said middle points;
   a distance calculation means for calculating a distance between said centroid and said average middle point;
   a symmetry discrimination means for judging whether said distance between said centroid and said average middle point is within a specified allowable range and, if so, setting said centroid as a center of point symmetry of said figure;
   a symmetrizing means for modifying at least one of said values of graphic features for shaping said figure into a point symmetric polygon having a center thereof at said center of point symmetry; and
   an output means for outputting said point symmetric polygon after shaping.

4. An apparatus for shaping a polygon recited in claim 3, wherein said symmetry discrimination means calculate said specified allowable range on the basis of said values of graphic features extracted from the figure.

5. An apparatus for shaping a polygon, comprising:
   an input means for inputting a figure;
   a feature extraction means for extracting values of graphic features including coordinates of vertexes from said figure when said figure is detected as a polygon;
   a vertex number judgment means for judging whether said figure is a polygon with an even number of vertexes or not from said values of graphic features extracted;
   a middle point calculation means for calculating, when a number of vertexes of said figure is detected to be 2n, n being an integer larger than one, coordinates of each middle point of n line segments, each of said n line segments linking m-th vertex and (n+m)-th vertex from a vertex of said figure m being an integer from one to n;
   a candidate center calculation means for calculating coordinates of a candidate of a center of point symmetry of said figure on condition that said figure is a quasi point symmetric figure;
   a distance calculation means for calculating each distance between said candidate and each of said middle points;
   a symmetry discrimination means for judging whether all of said distances between said candidate and each of said middle points are within a specified allowable range and, if so, setting said candidate as said center of point symmetry;
   a symmetrizing means for modifying at least one of said values of graphic features for shaping said figure into a point symmetric polygon having a center thereof at said center of point symmetry; and
   an output means for outputting said point symmetric polygon after shaping.

6. An apparatus for shaping a polygon recited in claim 5, wherein said candidate center calculation means calculates coordinates of said candidate of a center of point symmetry of said figure as coordinates of a center point of a minimum rectangle among rectangles which circumscribe at least two vertexes and surround the other vertexes of said figure.

7. An apparatus for shaping a polygon recited in claim 5, wherein said symmetry discrimination means calculate said specified allowable range on the basis of said values of graphic features extracted from the figure.

8. An apparatus for shaping a polygon, comprising:
   an input means for inputting a figure;
   a feature extraction means for extracting values of graphic features including coordinates of vertexes from said figure when said figure is detected as a polygon;
   a vertex number judgment means for judging whether said figure is a polygon with an even number of vertexes or not from said values of graphic features extracted;

a middle point calculation means for calculating, when a number of vertexes of said figure is detected to be 2n, n being an integer larger than one, coordinates of each middle point of n line segments, each of said n line segments linking m-th vertex and (n+m)-th vertex from a vertex of said figure, m being an integer from one to n and calculating coordinates of an average middle point from average values of coordinates of each of said middle points;

a candidate center calculation means for calculating coordinates of a candidate of a center of point symmetry of said figure on condition that said figure is a quasi point symmetric figure;

a distance calculation means for calculating a distance between said candidate and said average middle point;

a symmetry discrimination means for judging whether said distance between said candidate and said average middle point is within a specified allowable range and, if so, setting said candidate as said center of point symmetry;

a symmetrizing means for modifying at least one of said values of graphic features for shaping said figure into a point symmetric polygon having a center thereof at said center of point symmetry; and an output means for outputting said point symmetric polygon after shaping.

9. An apparatus for shaping a polygon recited in claim 8, wherein said candidate center calculation means calculates coordinates of said candidate of a center of point symmetry of said figure as coordinates of a center point of a minimum rectangle among rectangles which circumscribe at least two vertexes and surround the other vertexes of said figure.

10. An apparatus for shaping a polygon recited in claim 8, wherein said symmetry discrimination means calculate said specified allowable range on the basis of said values of graphic features extracted from the figure.

11. An apparatus for shaping a polygon, comprising:
an input means for inputting a figure;
a feature extraction means for extracting values of graphic features including coordinates of vertexes from said figure when said figure is detected as a polygon;
a vertex number judgment means for judging whether said figure is a polygon with an even number of vertexes or not from said values of graphic features extracted;
a candidate center calculation means for calculating, when a number of vertexes of said figure is detected to be 2n, n being an integer larger than one, coordinates of a candidate of a center of point symmetry of said figure on condition that said figure is a quasi point symmetric figure;
a symmetric point calculation means for calculating coordinates of n symmetric points of any n vertexes of said figure with respect to said candidate of a center of point symmetry;
a distance calculation means for calculating a length of each of n line segments, each of said n line segments linking said symmetric point and an associated vertex of each of said any n vertexes when a (m+n)-th vertex, when m is not larger than n, or a (m−n)-th vertex, when m is larger than n, is defined as said associate vertex of m-th vertex from a vertex of said figure, m being an integer from one to 2n;
a symmetry discrimination means for judging whether all of said lengths of said n line segments are within a specified allowable range and, if so, setting said candidate as said center of point symmetry;

a symmetrizing means for modifying at least one of said values of graphic features for shaping said figure into a point symmetric polygon having a center thereof at said center of point symmetry; and an output means for outputting said point symmetric polygon after shaping.

12. An apparatus for shaping a polygon recited in claim 11, wherein said candidate center calculation means calculates coordinates of said candidate of a center of point symmetry of said figure as coordinates of a center point of a minimum rectangle among rectangles which circumscribe at least two vertexes and surround the other vertexes of said figure.

13. An apparatus for shaping a polygon recited in claim 11, wherein said symmetry discrimination means calculate said specified allowable range on the basis of said values of graphic features extracted from the figure.

14. An apparatus for shaping a polygon, comprising:
an input means for inputting a figure;
a feature extraction means for extracting values of graphic features including coordinates of vertexes from said figure when said figure is detected as a polygon;
a vertex number judgment means for judging whether said figure is a polygon with an even number of vertexes or not from said values of graphic features extracted;
a candidate center calculation means for calculating, when a number of vertexes of said figure is detected to be 2n, n being an integer larger than one, coordinates of a candidate of a center of point symmetry of said figure on condition that said figure is a quasi point symmetric figure;
a symmetric point calculation means for calculating coordinates of n symmetric points of any n vertexes of said figure with respect to said candidate of a center of point symmetry;
a distance calculation means for calculating an average length of each of n line segments, each of said n line segments linking said symmetric point and an associated vertex of each of said any n vertexes when a (m+n)-th vertex, when m is not larger than n, or a (m−n)-th vertex (in case m is larger than n) is defined as said associate vertex of m-th vertex from a vertex of said figure, m being an integer from one to 2n;
a symmetry discrimination means for judging whether said average length of n line segments is within a specified allowable range and, if so, setting said candidate as said center of point symmetry;
a symmetrizing means for modifying at least one of said values of graphic features for shaping said figure into a point symmetric polygon having a center thereof at said center of point symmetry; and
an output means for outputting said point symmetric polygon after shaping.

15. An apparatus for shaping a polygon recited in claim 14, wherein said candidate center calculation means calculates coordinates of said candidate of a center of point symmetry of said figure as coordinates of a center point of a minimum rectangle among rectangles which circumscribe at least two vertexes and surround the other vertexes of said figure.

16. An apparatus for shaping a polygon recited in claim 14, wherein said symmetry discrimination means calculate said specified allowable range on the basis of said values of graphic features extracted from the figure.

* * * * *